US007918526B2

(12) United States Patent
Nobuta et al.

(10) Patent No.: US 7,918,526 B2
(45) Date of Patent: Apr. 5, 2011

(54) PRINTER AND METHOD PREVENTING FALSE DETECTION OF A DETECTED OBJECT

(75) Inventors: Kosaku Nobuta, Suwa (JP); Yasuhiko Yoshihisa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1209 days.

(21) Appl. No.: 11/544,520

(22) Filed: Oct. 6, 2006

(65) Prior Publication Data

US 2007/0081181 A1 Apr. 12, 2007

(30) Foreign Application Priority Data

Oct. 6, 2005 (JP) ................................ 2005-293335
Oct. 27, 2005 (JP) ................................ 2005-312313
Oct. 27, 2005 (JP) ................................ 2005-312314

(51) Int. Cl.
*B41J 29/393* (2006.01)
*B41J 29/38* (2006.01)
*H04B 1/00* (2006.01)

(52) U.S. Cl. ............................ 347/19; 702/193; 347/16

(58) Field of Classification Search .................... 347/19; 702/193, 191; 363/47
See application file for complete search history.

(56) References Cited

U.S. PATENT DOCUMENTS 5,975,666 A * 11/1999 Kawaguchi ........................ 347/8
7,540,586 B2 * 6/2009 Naito .............................. 347/37
2003/0142161 A1 * 7/2003 Miura et al. .................... 347/19
2004/0036732 A1 * 2/2004 Shoji .............................. 347/19
2007/0019023 A1 * 1/2007 Weast ............................. 347/16

FOREIGN PATENT DOCUMENTS

JP 05-155472 A 6/1993
JP 10-315553 A 12/1998
JP 11-180594 A 7/1999
JP A-2003-72964 3/2003
JP 2004-018227 A 1/2004
JP A-2005-103835 4/2005
JP A-2005-125766 5/2005
JP 2005-178268 A 7/2005

* cited by examiner

*Primary Examiner* — Matthew Luu
*Assistant Examiner* — Shelby Fidler
(74) *Attorney, Agent, or Firm* — Nutter McClellan & Fish LLP; John J. Penny, Jr.

(57) ABSTRACT

A printer is provided with: a detector, operable to output an output signal in accordance with a state of a printing medium transported within the printer; and a control signal generator, operable to generate a control signal in accordance with a level of the output signal relative to a threshold. In order to control the printer, the output signal is detected. A timing signal indicative of a timing to judge the state of the printing medium is detected. The control signal is generated with at least two of: a first method, in which the control signal is made valid when the level of the output signal reaches the threshold after the timing signal is detected, and the control signal is unchanged until when a first time period is elapsed from when the control signal is made valid; a second method, in which the control signal is made valid when the level of the output signal reaches the threshold at least once after the timing signal is detected, and the control signal is unchanged until when a next timing signal is detected; and a third method, in which the control signal is made valid in accordance with a condition that the level of the output signal lastly reaches the threshold before a second time period is elapsed from when the timing signal is detected, and the control signal is unchanged until when a next timing signal is detected.

4 Claims, 14 Drawing Sheets

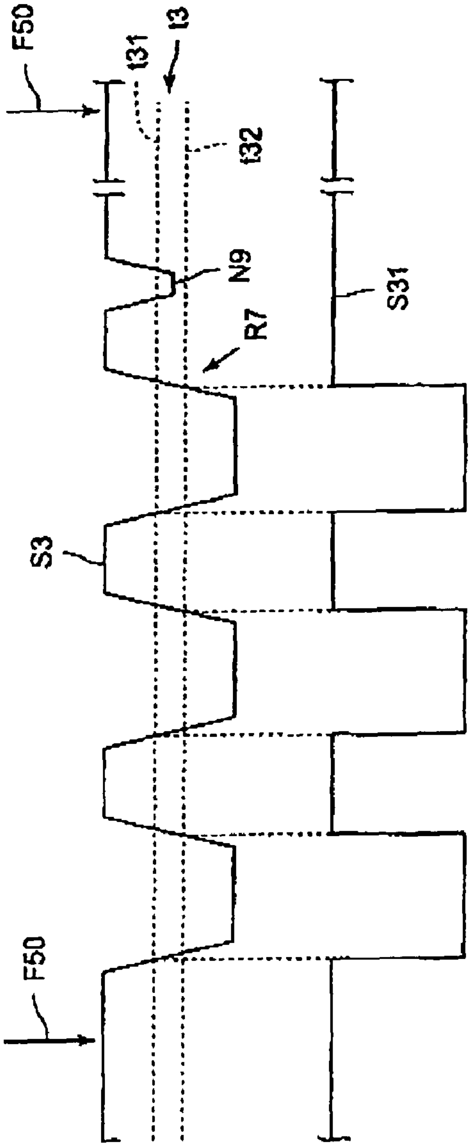
FIG. 13A
FIG. 13B
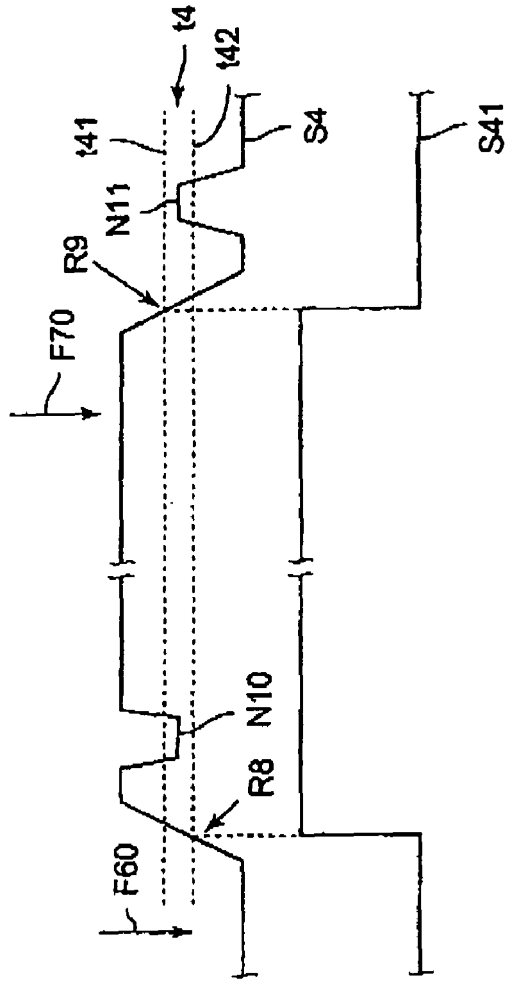
FIG. 14A
FIG. 14B

FIG. 15A
FIG. 15B
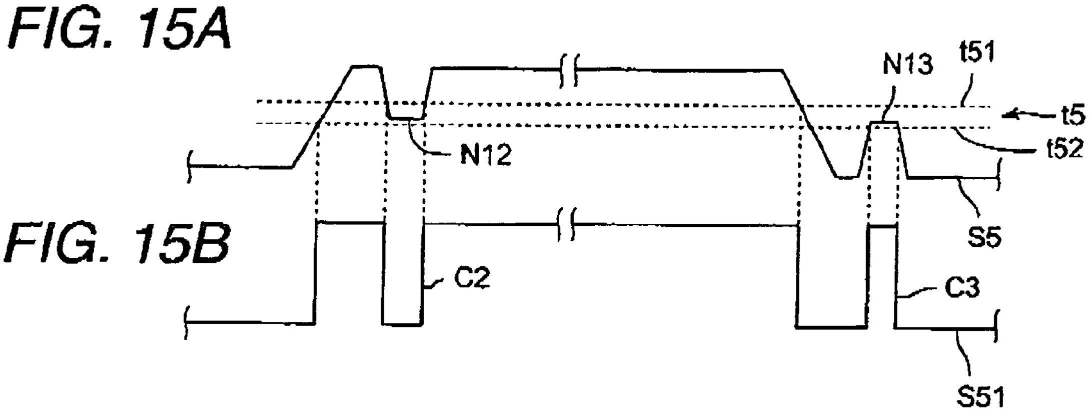
FIG. 16
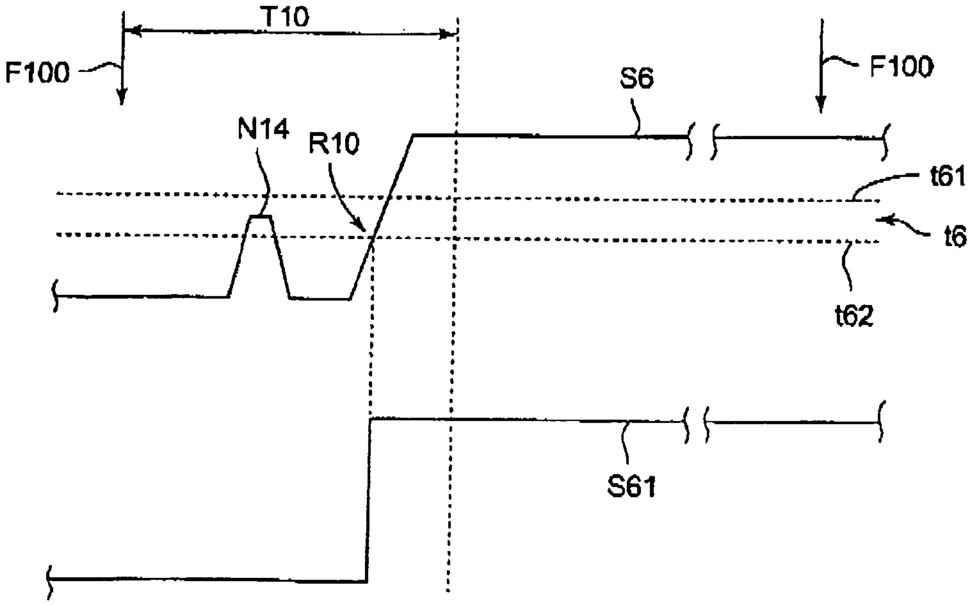

PRINTER AND METHOD PREVENTING FALSE DETECTION OF A DETECTED OBJECT

BACKGROUND

This application claims priority under 35 U.S.C. §119 to Japanese Patent Application No. 2005-293335 filed on Oct. 6, 2005, Japanese Patent Application No. 2005-312313 filed on Oct. 27, 2005 and Japanese Patent Application No. 2005-312314 filed on Oct. 27, 2005, the disclosures of which, including specifications, drawings and claims are incorporated herein by reference in their entireties.

TECHNICAL FIELD

The present invention relates to a printer and a method of controlling the same.

RELATED ART

As a printer for performing the printing on a printing medium, an ink jet printer for performing the printing by ejecting ink is well known. The ink jet printer of this type has a sheet detector for detecting a printing medium fed into the printer. Such a printer is disclosed in, for example, Japanese Patent Publication No. 2003-72964A (JP-A-2003-72964). The ink jet printer has a gap adjustment mechanism for adjusting a gap between an ink ejecting part for ejecting ink and a platen opposed to the ink ejecting part. Such a printer is disclosed in, for example, Japanese Patent Publication No. 2005-103835A (JP-A-2005-103835). The printer as disclosed in JP-A-2005-103835 has a gap detector for detecting the position of the ink ejecting part with respect to the platen. The sheet detector and the gap detector are optical detectors comprising a photo sensor having a light emitting element and a light receiving element, and a sensor lever for intercepting the light from the light emitting element to the light receiving element.

In recent years, the ink jet printer performs the printing on an optical disk such as a CD or a DVD, in addition to the printing sheet. The ink jet printer for performing the printing on the optical disk may have a disk tray on which the optical disk is laid, and a tray guide for guiding the disk tray into the inside of the printer. Such a printer is disclosed in, for example, Japanese Patent Publication No. 2005-125766A (JP-A-2005-125766). The printer as disclosed in JP-A-2005-125766 comprises a tray detector for detecting the presence or absence of a disk tray and a tray guide detector for confirming the open or closed condition of the tray guide. The tray detector and the tray guide detector are the mechanical detection devices having a contact switch with a switch lever and a sensor lever for pressing the switch lever.

Generally, a controller of the printer generates a control signal for judging the state of the printing medium to be detected, the ink ejecting part or the disk tray, based on an output signal from the sheet detector, the gap detector or the tray detector, and a predetermined threshold set to each output signal. For example, the controller of the printer generates a control signal S101 from an output signal S100 from the detector and a threshold range t100 having an upper threshold t101 and a lower threshold t102 is set to the output signal S100, as shown in FIG. 17.

Herein, the internal components of the printer are likely to be charged due to the passage of the printing medium. Therefore, static electricity is likely to occur at a contact part of the contact switch or a terminal part of the photo sensor. In the case where the detector is the mechanical detection device, a chattering occurs immediately after switching of the contact. That is, an electrical noise caused by static electricity or chattering occurs in the output signal from the detector. For example, the electrical noise N100 occurs in the output signal S100 from the detector, as shown in FIG. 17. Also, a level change C101 occurs in the control signal S101 under the influence of the electrical noise N100, causing the state of detected object to be falsely detected.

For example, a false judgment that the feeding of the printing medium is finished and the feeding of the next printing medium is started would be made. That is, the electrical noise N100 cause a false detection for the presence or absence of the printing medium fed into the inside of the printer.

To prevent this false detection, the printer is required to remove the influence of electrical noise occurring in the output signal. On the other hand, various detected objects may be detected in the printer. For example, there are various cases for feeding the printing medium into the inside of the printer, including a case for feeding consecutively plural sheets of printing medium into the inside of the printer to perform the continuous printing on plural sheets of printing medium, and a case for feeding only one sheet of printing medium into the inside of the printer to perform the printing on the only one sheet of printing medium. Therefore, even when the same configuration is uniformly employed to remove the influence of electrical noise, it may not be possible to fully prevent false detection depending on the detected object. The influence that the false detection of the detected object has on the overall control for the printer varies with the detected object. Therefore, it is not desirable to employ the same configuration uniformly to prevent the false detection of the state of detected object.

SUMMARY

It is therefore an advantage of some aspects of the invention to provide a printer and a method of controlling the same, capable of generating a control signal for judging the state of detected object appropriately according to the configurational features of the detected object to be detected.

According to one aspect of the invention, there is provided a method of controlling a printer which comprises:

a detector, operable to output an output signal in accordance with a state of a printing medium transported within the printer; and a control signal generator, operable to generate a control signal in accordance with a level of the output signal relative to a threshold, the method comprising:

detecting the output signal;

detecting a timing signal indicative of a timing to judge the state of the printing medium; and generating the control signal with at least two of:

a first method, in which the control signal is made valid when the level of the output signal reaches the threshold after the timing signal is detected, and the control signal is unchanged until when a first time period is elapsed from when the control signal is made valid;

a second method, in which the control signal is made valid when the level of the output signal reaches the threshold at least once after the timing signal is detected, and the control signal is unchanged until when a next timing signal is detected; and a third method, in which the control signal is made valid in accordance with a condition that the level of the output signal lastly reaches the threshold before a second time period is elapsed from when the timing signal is detected, and the control signal is unchanged until when a next timing signal is detected.

The control signal may be generated with at least the first method in a case where printing is performed with respect to a plurality of printing media consecutively. The control signal may be generated with the second method in a case where printing is performed with respect to only one printing medium.

The control signal may be generated with the second method to detect a leading edge of the first one of the printing media.

The control signal may be generated with the second method to detect a trailing edge of the last one of the printing media.

The method may further comprise counting the first time period with a first cycle. The output signal may be detected with a second cycle different from the first cycle.

The second cycle may be a cycle of a PID control with respect to either a first motor operable to move a carriage mounting a print head adapted to performing the printing, or a second motor operable to transport the printing medium.

According to one aspect of the invention, there is also provided a method of controlling a printer which comprises:

a first detector, operable to output a first output signal in accordance with a first state of a printing medium transported within the printer;

a second detector, operable to output a second output signal in accordance with a second state of a detected object other than the printing medium;

a first control signal generator, operable to generate a first control signal in accordance with a level of the first output signal relative to a first threshold; and a second control signal generator, operable to generate a second control signal in accordance with a level of the second output signal relative to a second threshold, the method comprising:

detecting the first output signal;

detecting a first timing signal indicative of a first timing to judge the first state;

generating the first control signal with at least a first method, in which the first control signal is made valid when the level of the first output signal reaches the first threshold after the first timing signal is detected, and the first control signal is unchanged until when a first time period is elapsed from when the first control signal is made valid;

detecting the second output signal;

detecting a second timing signal indicative of a second timing to judge the second state; and generating the second control signal with either one of:

a second method, in which the second control signal is made valid when the level of the second output signal reaches the second threshold at least once after the second timing signal is detected, and the second control signal is unchanged until when a next second timing signal is detected;

a third method, in which the second control signal is made valid in accordance with a condition that the level of the second output signal lastly reaches the second threshold before a second time period is elapsed from when the timing signal is detected, and the second control signal is unchanged until when a next second timing signal is detected; and a fourth method, in which the second control signal is changed in accordance with the level of the second output signal relative to the second threshold.

The detected object may be a distance between a face of a print head from which liquid is ejected to perform the printing and a platen opposing the face and adapted to support the printing medium. The second control signal may be generated with the second method.

The detected object may be a tray member adapted to support a disk medium to be subjected to the printing, and fed into the printer. The second control signal may be generated with the second method.

The detected object may be a tray guide adapted to guide a tray member adapted to support a disk medium to be subjected to the printing. The second control signal may be generated with the fourth method.

According to one aspect of the invention, there is also provided a printer, comprising:

a detector, operable to output an output signal in accordance with a state of a printing medium transported within the printer;

a control signal generator, operable to generate a control signal in accordance with a level of the output signal relative to a threshold; and a timing signal generator, operable to generate a timing signal which is indicative of a timing to judge the state of the printing medium, and is configured to be detected by the control signal generator, wherein:

the control signal is generated with at least two of:

a first method, in which the control signal is made valid when the level of the output signal reaches the threshold after the timing signal is detected, and the control signal is unchanged until when a first time period is elapsed from when the control signal is made valid;

a second method, in which the control signal is made valid when the level of the output signal reaches the threshold at least once after the timing signal is detected, and the control signal is unchanged until when a next timing signal is detected; and a third method, in which the control signal is made valid in accordance with a condition that the level of the output signal lastly reaches the threshold before a second time period is elapsed from when the timing signal is detected, and the control signal is unchanged until when a next timing signal is detected.

According to one aspect of the invention, there is also provided a printer, comprising:

a first detector, operable to output a first output signal in accordance with a first state of a printing medium transported within the printer;

a second detector, operable to output a second output signal in accordance with a second state of a detected object other than the printing medium;

a first control signal generator, operable to generate a first control signal in accordance with a level of the first output signal relative to a first threshold;

a second control signal generator, operable to generate a second control signal in accordance with a level of the second output signal relative to a second threshold;

a first timing signal generator, operable to generate a first timing signal which is indicative of a first timing to Judge the first state, and is configured to be detected by the first control signal generator; and a second timing signal generator, operable to generate a second timing signal which is indicative of a second timing to judge the second state, and is configured to be detected by the second control signal generator, wherein:

the first control signal is generated with at least a first method, in which the first control signal is made valid when the level of the first output signal reaches the first threshold after the first timing signal is detected, and the first control signal is unchanged until when a first time period is elapsed from when the first control signal is made valid; and the second control signal is generated with either one of:

a second method, in which the second control signal is made valid when the level of the second output signal reaches the second threshold at least once after the second timing signal is detected, and the second control signal is unchanged until when a next second timing signal is detected;

a third method, in which the second control signal is made valid in accordance with a condition that the level of the second output signal lastly reaches the second threshold before a second time period is elapsed from when the timing signal is detected, and the second control signal is unchanged until when a next second timing signal is detected; and a fourth method, in which the second control signal is changed in accordance with the level of the second output signal relative to the second threshold.

The "printing medium" includes not only plain paper for use in the normal document printing, but also photographic paper for use in the photograph printing, a cardboard that is thicker than the plain paper or photographic paper, and a transparent film such as a seal or an OHP sheet.

BRIEF DESCRIPTION OF THE DRAWINGS

The invention will be described with reference to the accompanying drawings, wherein like numbers reference like elements.

FIGS. 13A and 13B are time charts showing a relationship between a signal output from the platen gap detector and a control signal for judging a state of a platen gap.

FIGS. 14A and 14B are time charts showing a relationship between a signal output from the tray detector and a control signal for judging a state of the tray.

FIGS. 15A and 15B are time charts showing a relationship between a signal output from the tray guide detector and a control signal for judging a state of the tray guide.

FIG. 16 is a time chart showing a relationship between a signal output from a detector and a control signal for judging a state of a detected object, for explaining a follow-up detection.

DESCRIPTION OF EXEMPLARY EMBODIMENTS

Embodiments of the invention will be described below in detail with reference to the accompanying drawings.

Figure 1:
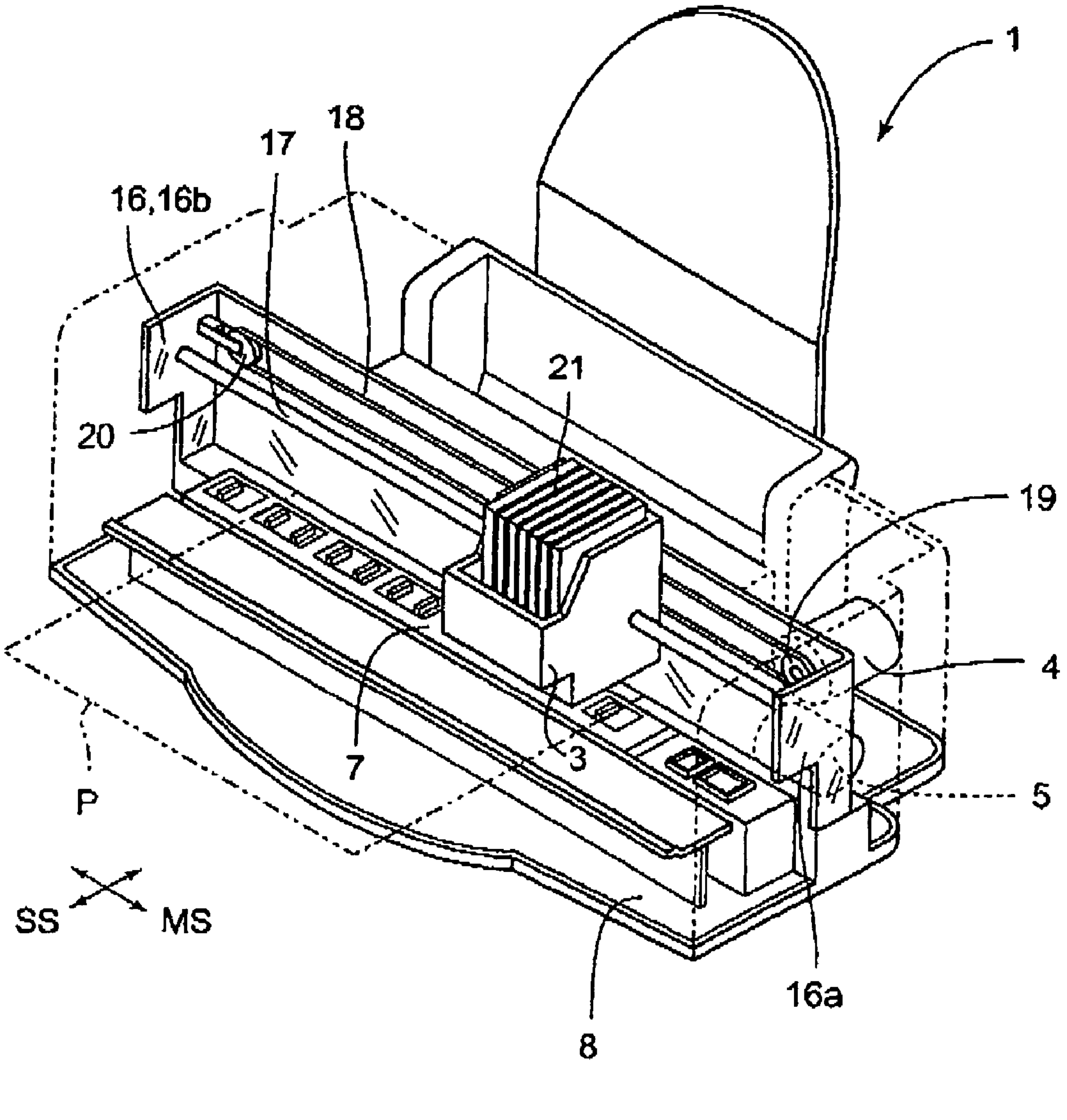
FIG. 1 is a perspective view showing a printer according to one embodiment of the invention.
Figure 2:
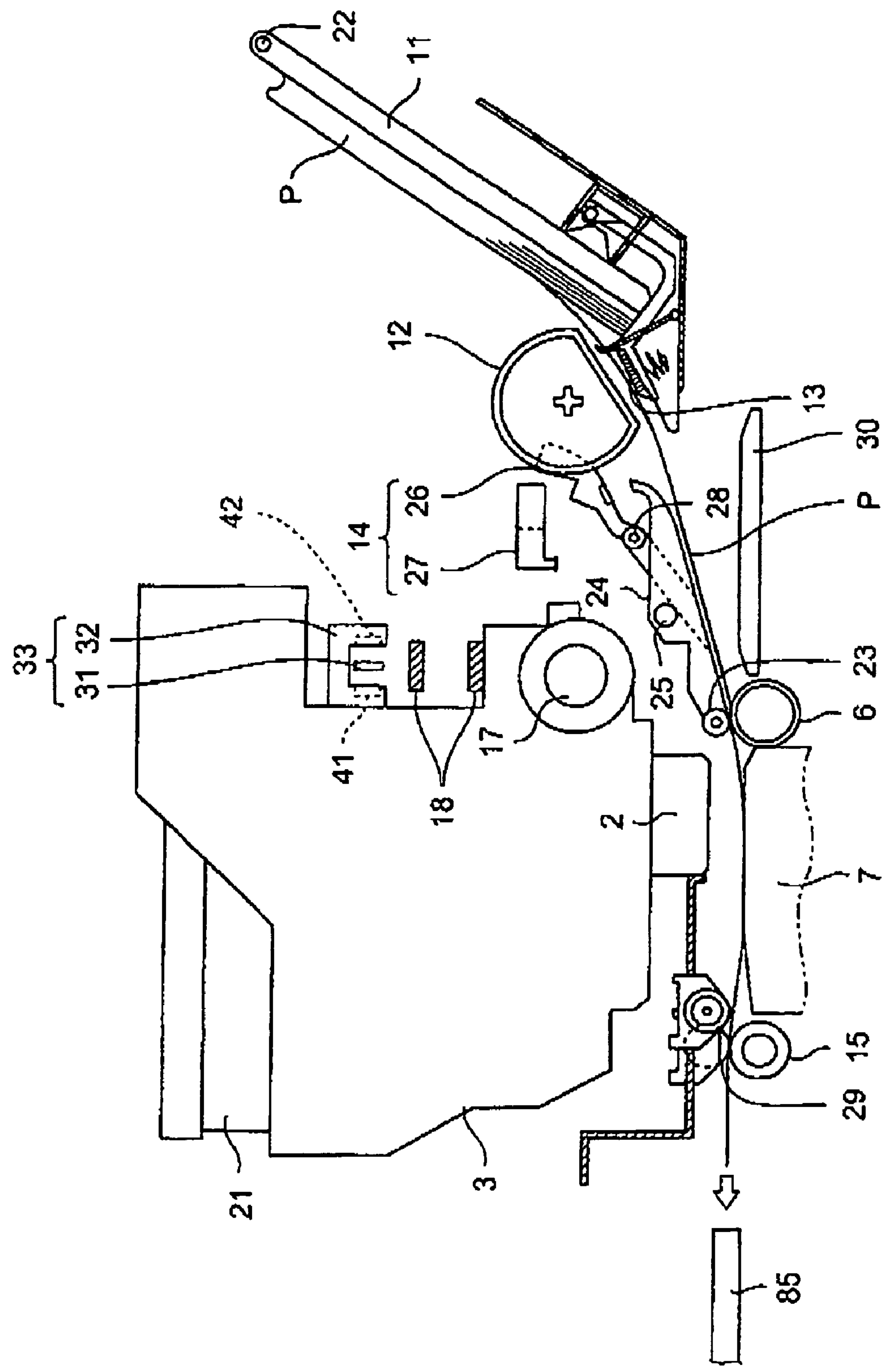
FIG. 2 is a side view showing an internal configuration of the printer.
Figure 3:
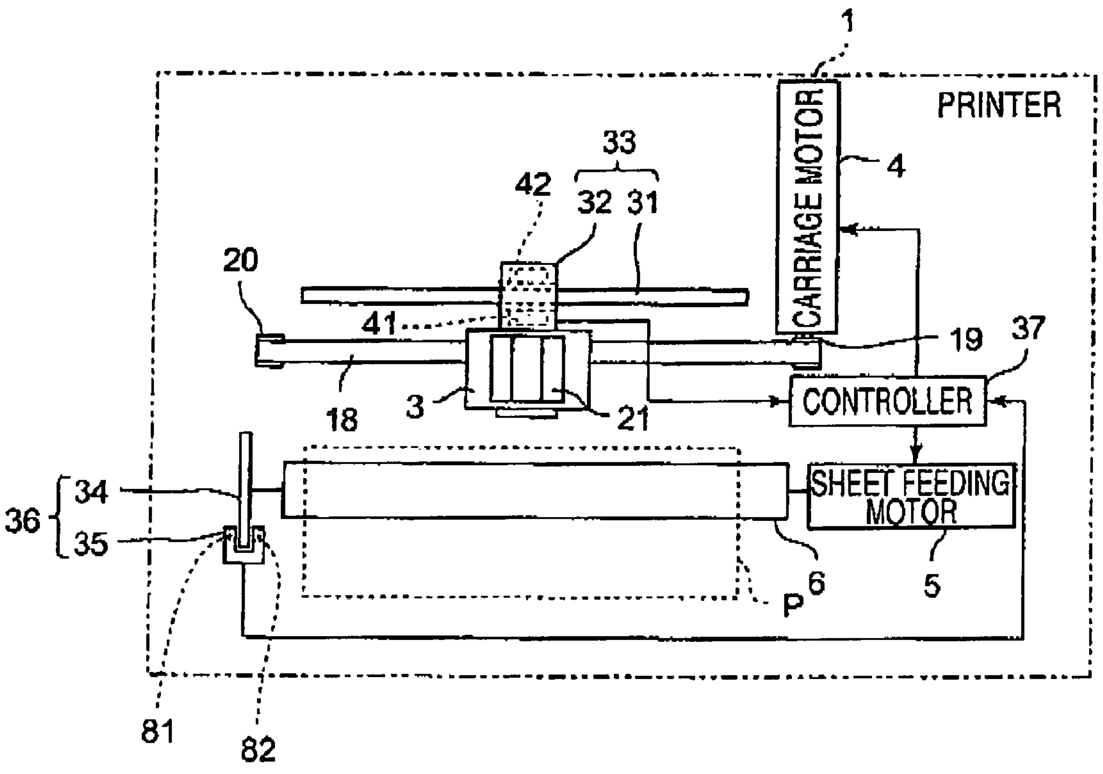
FIG. 3 is a schematic view showing a detection mechanism for a carriage and a sheet feeding roller 6 in the printer.

A printer 1 according to one embodiment of the invention is an ink jet printer for performing printing on a printing sheet P or an optical disk D such as CD or DVD by ejecting ink. The printer 1 of this embodiment comprises a carriage 3 mounting a print head 2 for ejecting ink droplets, a carriage motor 4 for driving the carriage 3 in a primary scanning direction MS, a sheet feeding motor 5 for conveying the printing sheet P in a secondary scanning direction SS, a sheet feeding roller 6 connected to the sheet feeding motor 5, a platen 7 disposed so as to oppose a noble face (lower face of FIG. 2) of the print head 2, and a main chassis 8 mounting the above components, as shown in FIGS. 1 to 3. In this embodiment, both the carriage motor 4 and the sheet feeding motor 5 are a direct current (DC) motor.

The printer 1 comprises a hopper 11 on which the printing sheet P to be subjected to the printing is laid, a sheet feeding roller 12 and a separation pad 13 for feeding the printing sheet P laid on the hopper 11 into the inside of the printer 1, a sheet guide plate 30 for guiding a leading edge of the printing sheet P fed from the hopper 11 into the inside of the printer 1 to the sheet feeding roller 6, a sheet detector 14 for detecting the passage of the printing sheet P fed from the hopper 11 into the inside of the printer 1, and a sheet ejecting roller 15 for ejecting the printing sheet P from the inside of the printer 1, as shown in FIG. 2.

Figure 5:
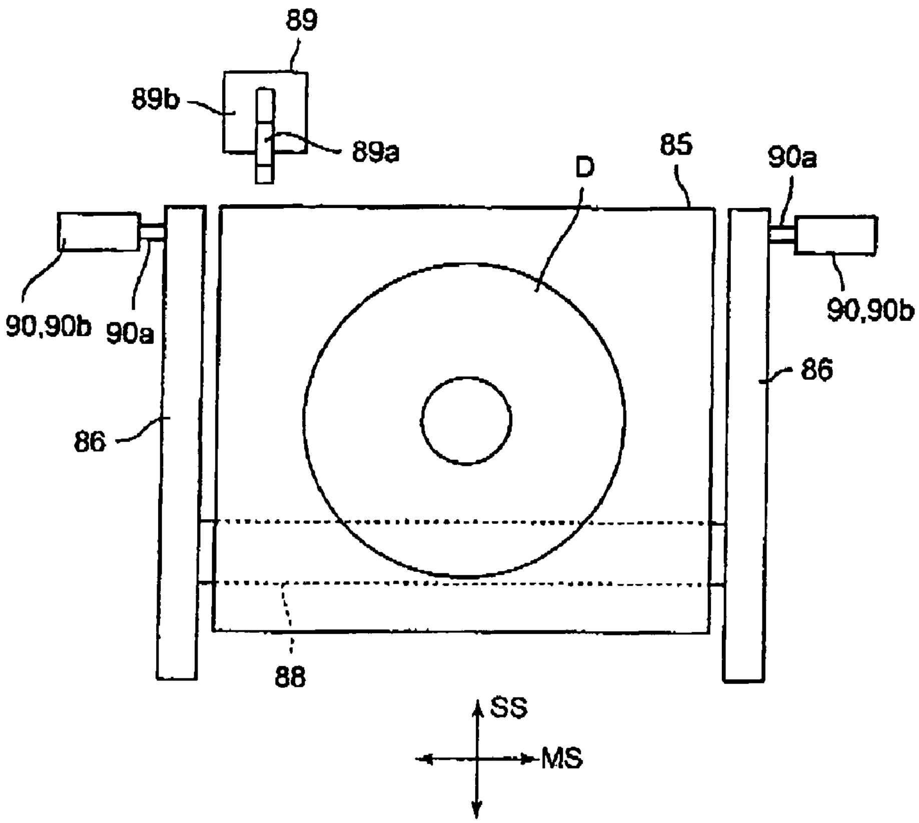
FIG. 5 is a plan view showing a disk tray, a tray detector and a tray guide detector in the printer.
Figure 6:
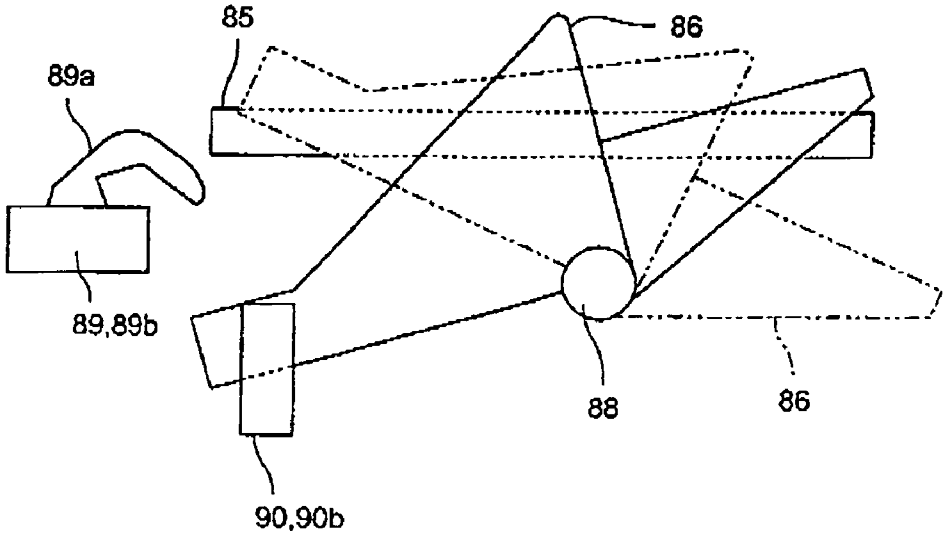
FIG. 6 is a side view of the disk tray, the tray detector and the tray guide detector.
Figure 8:
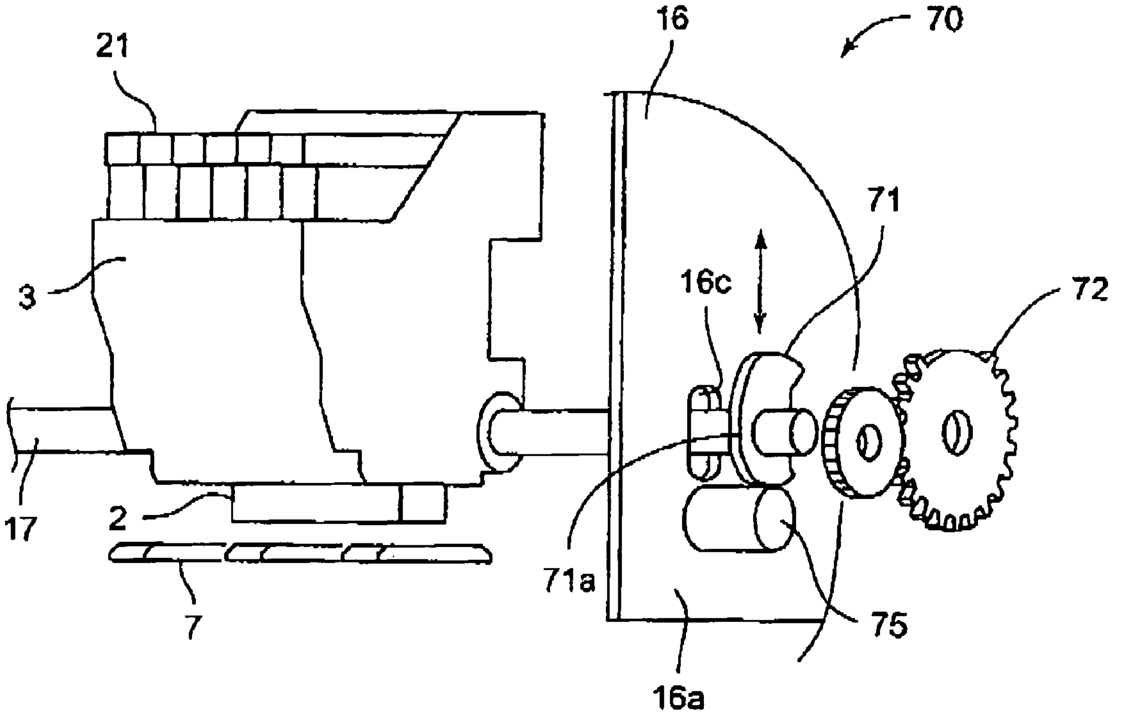
FIG. 8 is a perspective view of a platen gap adjuster in the printer.
Figure 9:
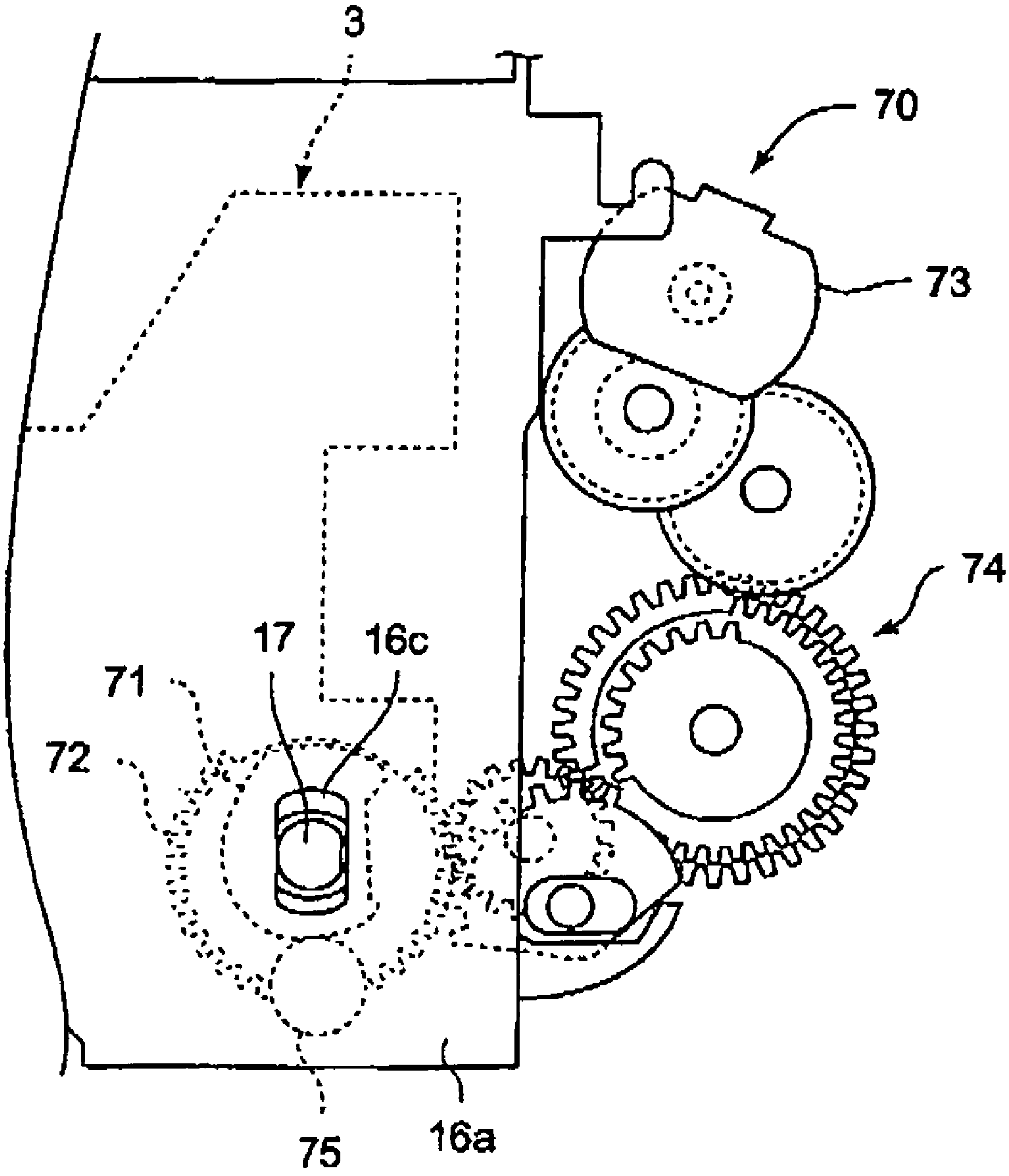
FIG. 9 is a side view of the platen gap adjuster.
Figure 10:
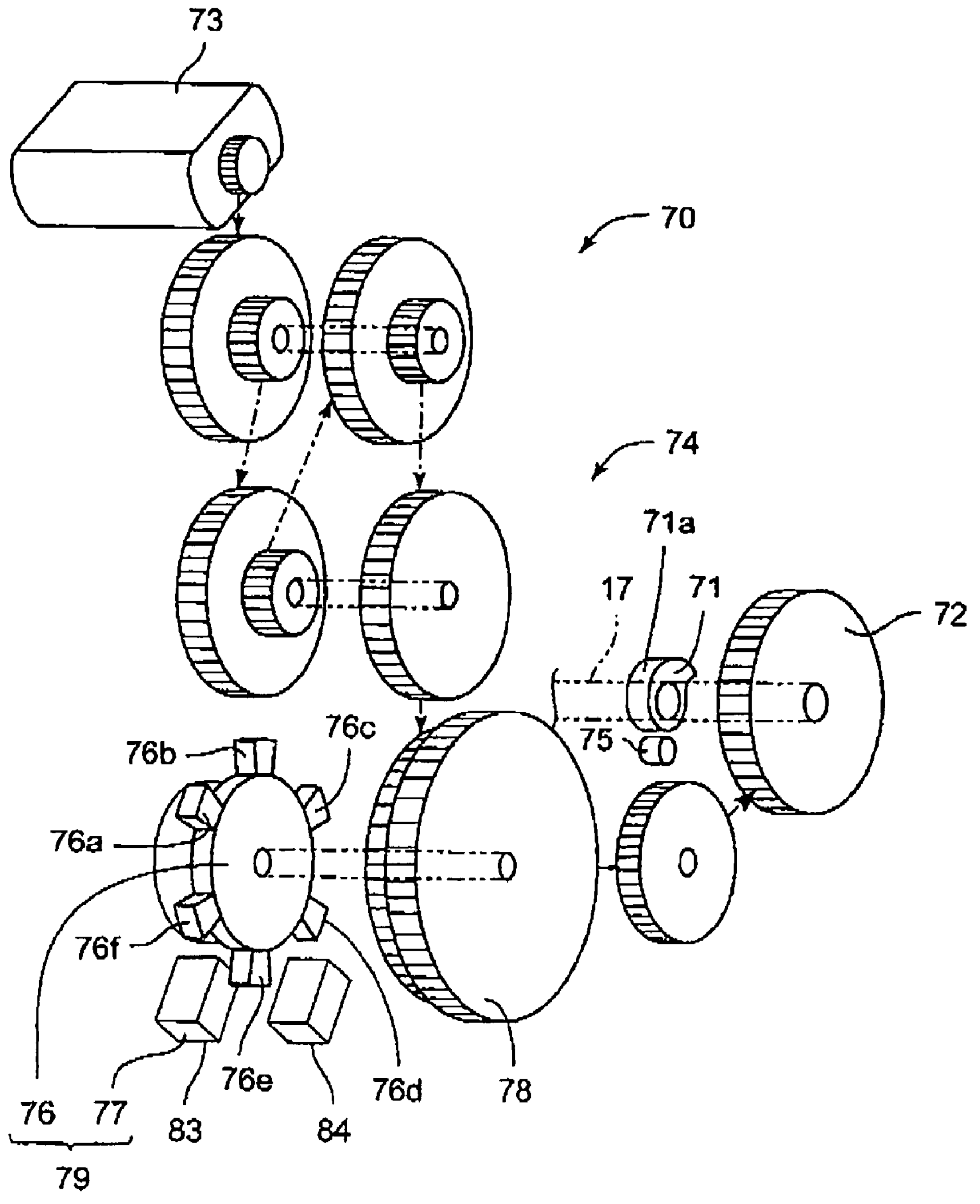
FIG. 10 is a perspective view showing a platen gap detector in the platen gap adjuster.

Further, the printer 1 comprises a disk tray 85 on which the optical disk D is laid and two tray guides 86 for guiding the disk tray 85 into the inside of the printer 1, as shown in FIGS. 2, 5 and 6. As shown in FIGS. 8 to 10, the printer 1 of this embodiment comprises a gap adjuster 70 for adjusting the gap between the nozzle face of the print head 2 and the platen 7, in accordance with the thickness of the printing sheet P.

The carriage 3 can be conveyed in the primary scanning direction MS by a guide shaft 17 supported on a support frame 16 fixed to the main chassis 8 and a timing belt 18. That is, the timing belt 18 has a part fixed to the carriage 3 (see FIG. 2), and is disposed to have a predetermined tension in a state where it is suspended between a pulley 19 attached on an output shaft of the carriage motor 4 and a pulley 20 rotatably attached to the support frame 16. The guide shaft 17 holds the carriage 3 slidably to guide the carriage 3 in the primary scanning direction MS. The carriage 3 mounts an ink cartridge 21 storing various kinds of ink supplied to the print head 2, in addition to the print head 2.

The print head 2 has arranged a plurality of nozzles, not shown. The print head 2 has disposed a piezoelectric element (not shown) having excellent response ability, which is one of the electrostrictive elements, to correspond to each nozzle, for example. More specifically, the piezoelectric element is disposed at a position in contact with a wall face forming an ink channel (not shown). And the print head 2 ejects the ink droplets from the nozzles disposed at the end part of the ink path because the wall face is pressed by the operation of this piezoelectric element. The ink cartridge 21 stores dye-based ink having excellent coloring property and producing excellent image quality, and pigment-based ink having excellent water-proof and light-proof properties, whereby the dye-based ink or the pigment-based ink is ejected from the print head 2.

The sheet feeding roller 12 is connected via a gear, not shown, to the sheet feeding motor 5, and driven by the sheet feeding motor 5. The hopper 11 is a plate-shaped member on which the printing sheet P can be laid, as shown in FIG. 2, and can be pivoted about a pivot axis 22 provided at the upper part by a cam mechanism, not shown. And a lower end part of the hopper 11 is pivoted by the cam mechanism, and resiliently pressed onto the sheet feeding roller 12, or separated from the sheet feeding roller 12. The separation pad 13 is formed from a member having a high friction coefficient, and disposed at a position opposite to the sheet feeding roller 12. And when the sheet feeding roller 12 is rotated, the surface of the sheet feeding roller 12 and the separation pad 13 are pressed together. Therefore, when the sheet feeding roller 12 is rotated, an uppermost one of printing sheets P laid on the hopper 11 is passed through a contact part between the surface of the sheet feeding roller 12 and the separation pad 13 and fed to the downstream side, but the remaining of printing sheets P laid are not conveyed to the downstream side by the separation pad 13.

The sheet feeding roller 6 is connected directly or via a gear, not shown, to the sheet feeding motor 5. The printer 1 is provided with a follower roller 23 for conveying the printing sheet P together with the sheet feeding roller 6, as shown in FIG. 2. The follower roller 23 is rotatably held on the downstream side of a follower roller holder 24 that can be pivoted about a pivot axis 25. The follower roller holder 24 is urged in a counterclockwise direction in FIG. 2 by a spring, not shown, so that the follower roller 23 may be subject to a urging force toward the sheet feeding roller 6 at any time. And when the sheet feeding roller 6 is driven, the follower roller 23 is also rotated together with the sheet feeding roller 6.

Figure 4A:
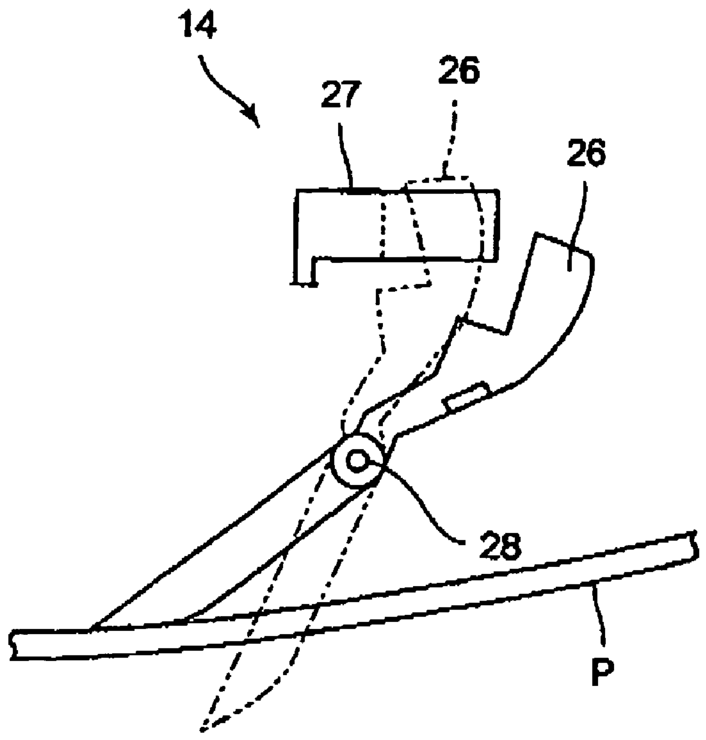
FIG. 4A is a side view of a sheet detector in the printer.
Figure 4B:
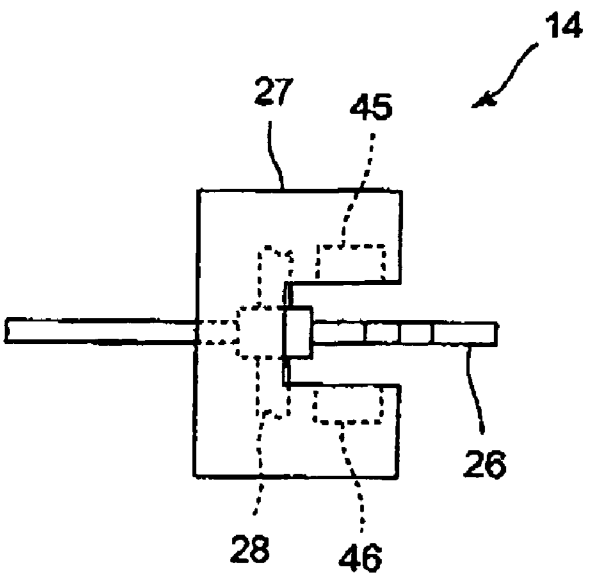
FIG. 4B is a plan view of the sheet detector.

The sheet detector 14 outputs an output signal according to the presence or absence of the printing sheet P. This sheet detector 14 comprises a detection lever 26 and a photo sensor 27, and is provided near the follower roller holder 24, as shown in FIGS. 2 and 4. The photo sensor 27 comprises a light emitter 45 having a light emitting element (not shown) and a light receiver 46 having a light receiving element (not shown), as shown in FIG. 4B. The detection lever 26 can be pivoted about a pivot axis 28, and when the printing sheet P is fed into the inside of the printer 1, the detection lever 26 is placed in a state as indicated by the solid line in FIG. 4A, or when the printing sheet P is not fed into the inside of the printer 1, the detection lever 26 is placed in a state as indicated by the dashed chain line in FIG. 4A.

That is, when the leading edge of the printing sheet P fed into the inside of the printer 1 comes into contact with a lower end part of the detection lever 26 in the state as indicated by the dashed chain line in FIG. 4A, the detection lever 26 is moved in the clockwise direction, as indicated by the solid line in FIG. 4A, so that the light from the light emitter 45 intercepted by the detection lever 26 is detected by the light receiver 46. While the printing sheet P passes under the detection lever 26, the light from the light emitter 45 is detected by the light receiver 46. Also, when the trailing edge of the printing sheet P gets but of the lower end part of the detection lever 26, and the printing sheet P completely passes under the detection lever 26, the detection lever 26 is moved in the counterclockwise direction, so that the light from the light emitter 45 toward the light receiver 46 is intercepted. In this way, the sheet detector 14 outputs an output signal according to the presence or absence of the printing sheet P fed into the inside of the printer 1 to detect the passage of the printing sheet P.

The sheet ejecting roller 15 is disposed on the downstream side of the printer 1, and connected via a gear, not shown, to the sheet feeding motor 5. The printer 1 is provided with a follower roller 29 for ejecting the printing sheet P, together with the sheet ejecting roller 15, as shown in FIG. 2. The follower roller 29, like the follower roller 23, is subjected to an urging force toward the sheet ejecting roller 15 by a spring, not shown, at any time. And when the sheet ejecting roller 15 is driven, the follower roller 29 is rotated together with the sheet ejecting roller 15.

The disk tray 85 goes into or out of the inside of the printer 1 from the front side, while printing on the optical disk D, as shown in FIG. 2. Not to prevent this disk tray 85 from going into or out of the inside of the printer 1, the sheet feeding roller 6, the platen 7, the paper guide plate 30 and the sheet ejecting roller 15 are made to descend from the state of FIG. 2, whereby the printer 1 can accept the disk tray 85 to perform the printing on the optical disk D.

The printer 1 comprises a linear encoder 33 having a linear scale 31 and a photo sensor 32 as a position detector for detecting the position and speed of the carriage 3 in the primary scanning direction MS, as shown in FIGS. 2 and 3. The printer 1 comprises a rotary encoder 36 having a rotary scale 34 and a photo sensor 35 as a position detector for detecting the position and conveying speed (specifically the rotary position and rotating speed of the sheet feeding roller 6) of the printing sheet P in the secondary scanning direction SS, as shown in FIG. 3. A signal outputted from the linear encoder 33 and the rotary encoder 36 is inputted into a controller 37 for controlling the printer 1 in various ways, as shown in FIG. 3. For the sake of convenience, the linear scale 31 is not shown in FIG. 1.

The photo sensor 32 making up the linear encoder 33 comprises a light emitter 41 and a light receiver 42, as shown in FIGS. 2 and 3. This photo sensor 32 is fixed on the rear face of the carriage 3. The linear scale 31 is formed from a transparent thin plate made of resin or a thin steel plate made of stainless. This linear scale 31 is attached on the support frame 16 so as to extend in parallel to the primary scanning direction MS. The linear scale 31 has a light transmitting part (not shown) for transmitting the light from the light emitter 41 of the photo sensor 32 and a light shielding part (not shown) for intercepting the light from the light emitter 41 of the photo sensor 32, which are formed alternately along the longitudinal direction thereof. When the carriage 3 is moved, the linear scale 31 is moved relatively between the light emitter 41 and the light receiver 42 of the photo sensor 32. And the photo sensor 32 outputs an output signal at a cycle according to the moving speed of the carriage 3, along with the relative movement of the linear scale 31.

The photo sensor 35 making up the rotary encoder 36 comprises a light emitter 81 and a light receiver 82, as shown in FIG. 3, and is fixed on the main chassis 8 via a bracket, not shown. The rotary scale 34 is a disk-shaped member formed from a thin steel plate made of stainless or a transparent thin plate made of resin. This rotary scale 34 of this embodiment is attached on the sheet feeding roller 6 to be rotatable integrally with the sheet feeding roller 6. That is, when the sheet feeding roller 6 is rotated once, the rotary scale 34 is also rotated once. This rotary scale 34 has a light transmitting part (not shown) for transmitting the light from the light emitter of the photo sensor 35 and a light intercepting part (not shown) for intercepting the light from the light emitter of the photo sensor 35, which are formed alternately along the circumferential direction. When the sheet feeding roller 6 is rotated, the rotary scale 34 is rotated relatively between the light emitter 81 and the light receiver 82 of the photo sensor 35. And the photo sensor 35 outputs an output signal at a cycle according to the rotating speed of the sheet feeding roller 6, along with the relative rotation of the rotary scale 34.

The disk tray 85 is a box-shaped member on which a stage of the optical disk D is formed, as shown in FIG. 5. This disk tray 85 is moved vertically in FIG. 5 (or laterally in FIG. 6), by a tray motor, not shown, to go into or out of the inside of the printer 1. The tray guides 86 are provided respectively on both sides of the disk tray 85 in the primary scanning direction MS, as shown in FIG. 5. Each of the two tray guides 86 is pivotable about a pivot axis 88. The pivot of the two tray guides 86 is made manually (by the user). The tray guides 86 are in a state as indicated by the dashed chain line in FIG. 6, when the printing is performed on the printing sheet P. The tray guides 86 are in a state as indicated by the solid line in FIG. 6, when the printing is performed on the optical disk D. That is, when the user pivots each of the two tray guides 86 about the stationary axis 88 from the state as indicated by the dashed chain line in FIG. 6, the two tray guides 86 are placed in the state as indicated by the solid line in FIG. 6, to guide the disk tray 85. The tray guides 86 are positioned and fixed by a coil spring, not shown, in the state as indicated by the solid line and the state as indicated by the dashed chain line in FIG. 6. When the disk tray 85 is moved upward in FIG. 5, or the disk tray 85 is moved to the left in FIG. 6, the disk tray 85 is inserted into the inside of the printer 1. The tray motor, not shown, is a DC motor, for example.

Also, a tray detector 89 for detecting that the disk tray 85 is fed into the inside of the printer 1 and two tray guide detectors 90 for detecting the state of the two tray guides 86 are provided on the front side of the printer 1, as shown in FIGS. 5 to 7.

The tray detector 89 is a mechanical contact switch composed of a switch lever 89*a* and a contact part 89*b*. In this tray detector 89, a contact point (not shown) of the contact part 89*b* is turned on, when the disk tray 85 is moved to the left in FIG. 6 to make contact with the switch lever 89*a* and cause the switch lever 89*a* to be moved by a predetermined angle in the clockwise direction (i.e., the disk tray 85 is fed into the inside of the printer 1), or the contact point of the contact part 89*b* is turned off, when the disk tray 85 is located to the right in FIG. 6 to be out of contact with the switch lever 89*a* (i.e., the disk tray 85 is not fed into the inside of the printer 1). In this way, the tray detector 89 outputs an output signal according to whether or not the disk tray 85 is fed into the inside of the printer 1 (i.e., whether or not the disk tray 85 resides in the inside of the printer 1).

Figure 7A:
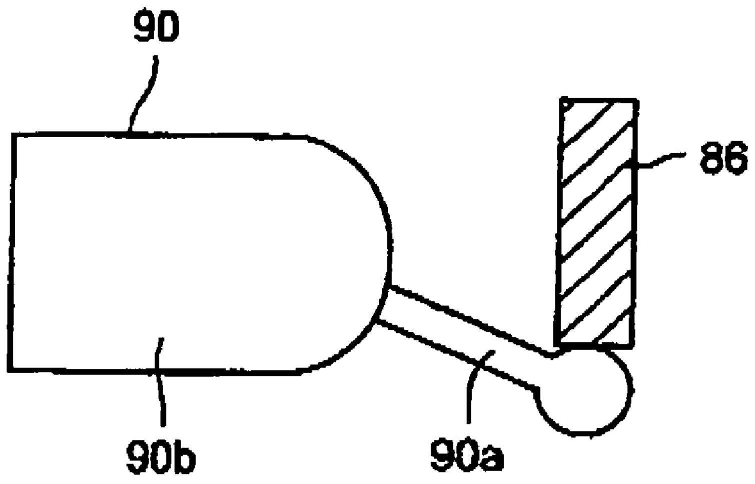
FIG. 7A is a schematic view showing a state of the tray guide detector when a tray guide in the printer is not used.
Figure 7B:
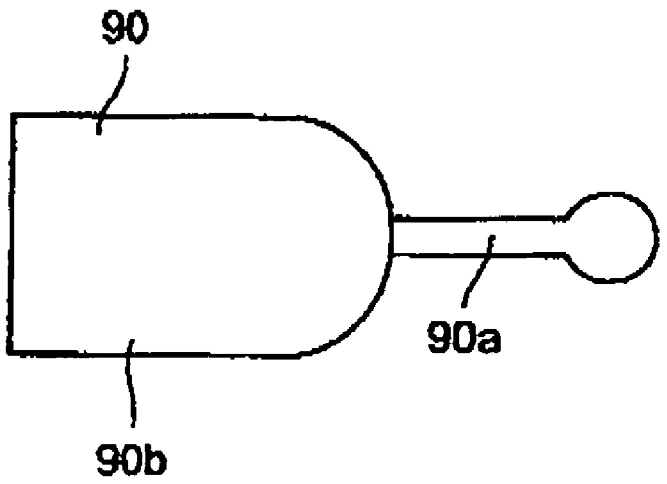
FIG. 7B is a schematic view showing a state of the tray guide detector when the tray guide is used.

The tray guide detector 90, like the tray detector 89, is a mechanical contact switch composed of a switch lever 90*a* and a contact part 90*b*. In this tray guide detector 90, when the tray guide 86 is in the state as indicated by the solid line in FIG. 6, the tray guide 86 comes in contact with the switch lever 90*a* to cause the switch lever 90*a* to be moved by a predetermined angle, so that the contact point (not shown) of the contact part 90*b* is turned on, as shown in FIG. 7A. The tray guide 86 is separated from the switch lever 90*a* in the state as indicated by the dashed chain line in FIG. 6. That is, the tray guide detector 90 is placed in a state as shown in FIG. 7B, whereby the contact point of the contact part 90*b* is turned off. In this way, the tray guide detector 90 outputs an output signal according to the state of the tray guide 86 (i.e., whether or not the disk tray 85 can be guided).

The gap adjuster 70 moves the guide shaft 17 in the vertical direction relative to the support frame 16 by the cam mechanism, as shown in FIG. 8. This gap adjuster 70 is provided on each of one side (right side in FIG. 1) 16*a* of the support frame 16 and the other side (left side in FIG. 1) 16*b*. In the following, taking the gap adjuster 70 provided on one side 16*a* of the support frame 16 as an example, the configuration of the gap adjuster 70 will be described below.

As shown in FIGS. 8 to 10, the gap adjuster 70 comprises an eccentric cam 71 fixed at one end (right end in FIG. 1) of the guide shaft 17, a first follower gear 72 fixed at one end of the guide shaft 17, a gear train 74 for transmitting a motive force of a gap adjusting motor 73 to the first follower gear 72, a fixing pin 75 secured to one side face 16*a* and contacted by a cam face 71*a* of the eccentric cam 71, a gap detector 79, having a detection plate 76 and a photo sensor 77, for detecting a rotary position (i.e., a gap between the nozzle face of the print head 2 and the platen 7) of the eccentric cam 71, and a second follower gear 78, connected to the gear train 74, for rotating the detection plate 76. The gap adjusting motor 73 in this embodiment is a DC motor.

As shown in FIG. 8, a slot 16*c* elongated in the vertical direction is formed through one side face 16*a* of the support frame 16. The guide shaft 17 is inserted through the slot 16*c*. The eccentric cam 71 and the first follower gear 72 are secured from the inside in this order at an end portion of the guide shaft 17 extending from one side face 16*a*. The fixing pin 75 is secured under the slot 16*c*. The cam face 71*a* of the eccentric cam 71 comes in contact with the fixing pin 75 due to the weight of the carriage 3. The cam face 71*a* of the eccentric cam 71 is formed so that the radius from the rotation center may be changed stepwise. For example, the radius of the cam face 71*a* from the rotation center of the eccentric cam 71 is changed in the circumferential direction at five steps so that the height position (i.e., gap between the nozzle face of the print head 2 and the platen 7) of the print head 2 may be set at five steps.

The detection plate 76 is a disk-shaped member having a plurality of detection parts 76*a* to 76*f* extending outward in the circumferential direction, as shown in FIG. 10. For example, the detection plate 76 has six detection parts 76*a* to 76*f*. The detection plate 76 is secured to the second follower gear 78 by way of a shaft or the like, and rotated integrally with the second follower gear 78. The photo sensor 77 has a light emitter 83 and a light receiver 84, and is disposed so that the detection parts 76*a* to 76*f* may pass between the light emitter 83 and the light receiver 84.

In the gap adjuster 70, when the gap adjusting motor 73 is rotated, a driving force of the gap adjusting motor 73 is transmitted via the gear train 74 to the first follower gear 72, so that the guide shaft 17 and the eccentric cam 71 are rotated together with the first follower gear 72. When the eccentric cam 71 is rotated, the distance between the guide shaft 17 at the rotation center of the eccentric cam 71 and the fixing pin 75 is changed, so that the guide shaft 17 is moved up or down from the support frame 16. That is, the carriage 3 is moved up or down. A driving force of the gap adjusting motor 73 is transmitted via the gear train 74 to the second follower roller 78, so that the detection plate 76 is rotated integrally with the second follower gear 78.

In this embodiment, when any one of the detection parts 76*a* to 76*f* intercepts the light from the light emitter 83 toward the light receiver 84, the print head 2 is at the preset height.

That is, when any one of the detection part 76*a* to 76*f* intercepts the light from the light emitter 83 toward the light receiver 84, the gap between the nozzle face of the print head 2 and the platen 7 is equal to the preset gap according to the thickness of the printing sheet P. For example, when the detection part 76*e* intercepts the light from the light emitter 83 toward the light receiver 84, the print head 2 is at the first height, as shown in FIG. 10. Herein, assuming that the height of the print head 2 is the second height when the detection part 76*f* intercepts the light from the light emitter 83 toward the light receiver 84, the eccentric cam 71 is rotated by the gap adjusting motor 73 to change the height of the print head 2 from the first height to the second height. Along with the rotation of the eccentric cam 71, the detection plate 76 is rotated in the counterclockwise direction in FIG. 10. And when the detection part 76*f* intercepts the light from the light emitter 83 toward the light receiver 84, the gap adjusting motor 73 is stopped so that the height of the print head 2 is placed at the second height. In this way, the gap detector 79 outputs an output signal according to the set height of the print head 2 of detected object.

Figure 11:
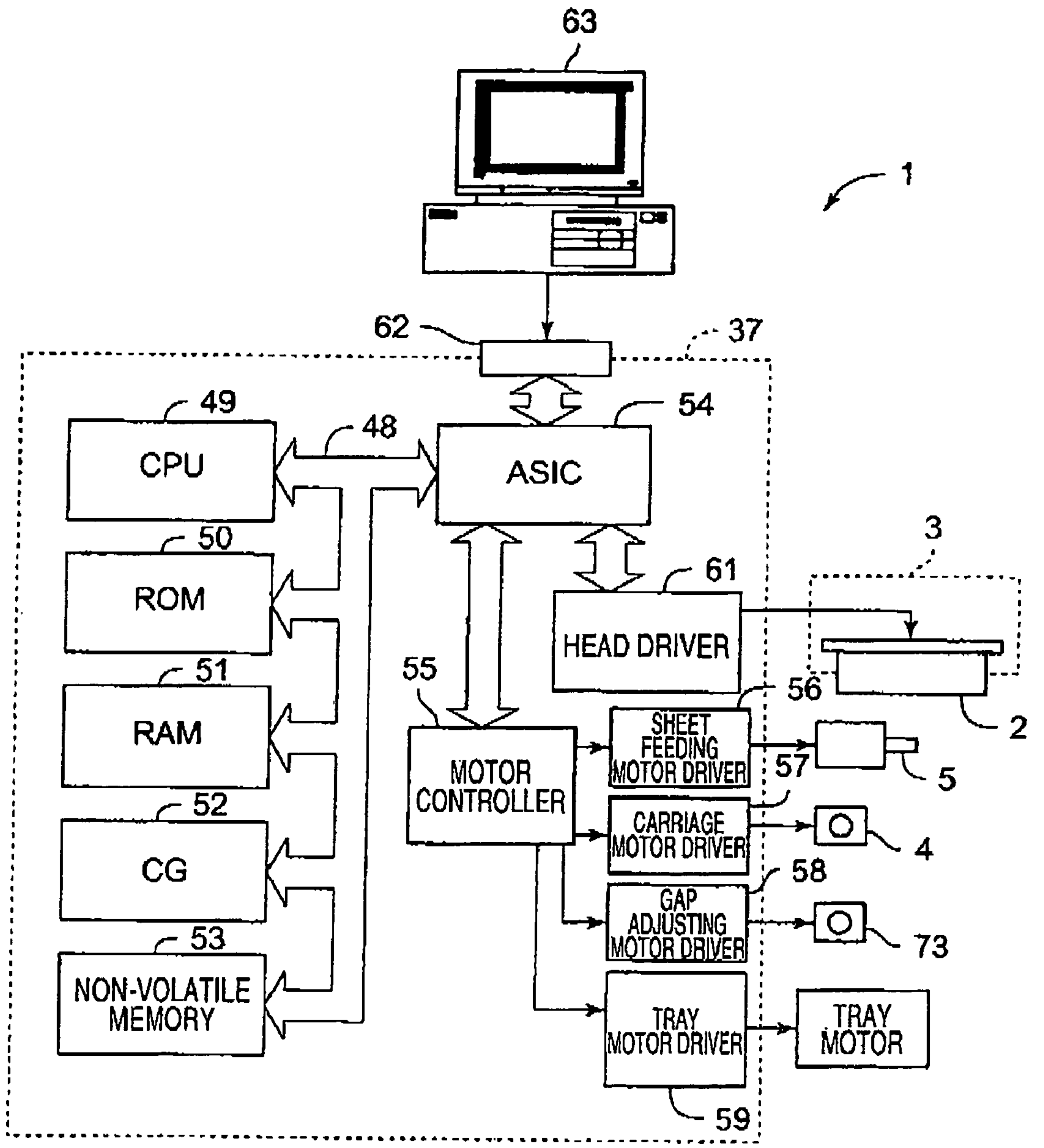
FIG. 11 is a block diagram showing a control system of the printer.

As shown in FIG. 11, the controller 37 comprises a bus 48, a CPU 49, a ROM 50, a RAM 51, a character generator (CG) 52, a non-volatile memory 53, an ASIC 54, a motor controller 55, a sheet feeding motor driver 56, a carriage motor driver 57, a gap adjusting motor driver 58, a tray motor driver 59, and a head driver 61. Each output signal from the linear encoder 33 and the rotary encoder 36 is inputted into the CPU 49 and the ASIC 54.

The CPU 49 makes the arithmetic operations for executing a control program of the printer 1 stored in the ROM 50 or the non-volatile memory 53 and other necessary arithmetic operations. The ROM 50 stores the data required for the control program for controlling the printer 1 and the processings.

The RAM 51 temporarily stores the program in the course of execution by the CPU 49 and the data in the course of arithmetic operation. The CG 52 stores dot pattern data corresponding to a print signal inputted into the ASIC 54. The non-volatile memory 53 stores various kinds of data required to be retained after the power of the printer 1 is turned off.

The ASIC 54 controls various kinds of motor such as the carriage motor 4 and the sheet feeding motor 5 and the print head 2 via the motor controller 55 and the head driver 61. The cyclic output signals from the photo sensor 32 of the linear encoder 33 and the photo sensor 35 of the rotary encoder 36 are inputted into the ASIC 54, The ASIC 54 has a timer of 1 kHz and a timer of 1 MHz, both not shown That is, the ASIC 54 has a timer with a counting cycle of 1 msec and a timer with a counting cycle of 1 μsec.

An output signal from the sheet detector 14 is inputted into the ASIC 54, which generates a control signal for judging the presence or absence of the printing sheet P fed into the inside of the printer 1 from the output signal that has been inputted and the threshold set for the output signal, Similarly, each output signal from the gap detector 79, the tray detector 89 and the tray guide detector 90 is inputted into the ASIC 54, which generates a control signal for judging the position of the print head 2, a control signal for judging the presence or absence of the disk tray 85, and a control signal for judging the state of the tray guide 86 from each output signal that has been inputted and the threshold set for each output signal. That is, in this embodiment, a part of the ASIC 54 is a control signal generator for generating a control signal for judging the state of the printing sheet P, the print head 2, the disk tray 85 and the disk guide 86 from each output signal outputted from the sheet detector 14, the gap detector 79, the tray detector 89 and the tray guide detector 90 and the threshold set for each output signal. Also, in this embodiment, a part of the ASIC 54 is a timing signal generator for outputting a timing signal for notifying the timing of judging the state of the printing sheet P, the print head 2 and the disk tray 85 of detected object to the control signal generator in generating the control signal. A method for generating each control signal and the timing signal will be described later in detail.

The motor controller 55 is a control circuit for controlling the speed of each of the carriage motor 4, the sheet feeding motor 5 and the gap adjusting motor 73. This motor controller 55 makes various arithmetic operations for the speed control of the carriage motor 4, the sheet feeding motor 5 and the gap adjusting motor 73, based on an operation instruction signal of the motor sent from the ASIC 54, and outputs a motor control signal to the sheet feeding motor driver 56, the carriage motor driver 57, the gap adjusting motor driver 58 and the tray motor driver 59 based on the arithmetic operation results. In this embodiment, as a method for controlling the carriage motor 4 and the sheet feeding motor 5, a PID control is adopted for controlling the current rotation speed of the carriage motor 4 or the sheet feeding motor 5 to converge into the target rotation speed by combining the proportional, integral and derivative controls. That is, in this embodiment, the motor controller 55 outputs a PID control signal based on the output signal from the linear encoder 33 to the carriage motor driver 57, and outputs a PID control signal based on the output signal from the rotary encoder 36 to the sheet feeding motor driver 56.

Specifically, the ASIC 54 generates the speed information signal or position information signal for the carriage 3 or the sheet feeding roller 6 based on the output signals from the photo sensors 32 and 35. The motor controller 55 outputs the PID control signal generated from the speed information signal or position information signal sent from the ASIC 54.

In the motor controller 55, the PID control signal outputted to the carriage motor driver 57 is generated at the control cycle (operation cycle) for the PID control according to the cycle of the output signal from the photo sensor 32. The control cycle for this PID control is 58.5 μsec, for example. Also, in the motor controller 55, the PID control signal outputted to the sheet feeding motor driver 56 is generated at the control cycle for the PID control according to the cycle of the output signal from the photo sensor 35. The control cycle for this PID control is 64 μsec, for example.

The sheet feeding motor driver 56 controls the driving of the sheet feeding motor 5 in accordance with a motor control signal from the motor controller 55. In this embodiment, as a control method for the sheet feeding motor 5, a PWM control, for example, is adopted, in which the sheet feeding motor driver 56 outputs a PWM drive signal. The carriage motor driver 57, the gap adjusting motor driver 58 and the tray motor driver 59 similarly control the driving of the carriage motor 4, the gap adjusting motor 73 and so on in accordance with a motor control signal from the motor controller 55. In this embodiment, the carriage motor 4 and the gap adjusting motor 73, like the sheet feeding motor 5, are controlled by the PWM control.

The head driver 61 drives the piezoelectric elements (not shown) of the print head 2, based on an operation instruction sent from the CPU 49 or the ASIC 54.

The bus 48 is a signal line connecting the above components of the controller 37. The CPU 49, the ROM 50, the RAM 51, the CG 52, the non-volatile memory 53 and the ASIC 54 are interconnected via this bus 48 so that the data can be sent or received between them.

The printer 1 as configured in the above way performs the printing on the printing sheet P in a state where the sheet feeding roller 6, the platen 7, the sheet guide plate 30 and the sheet ejecting roller 15 are placed in the position shown in FIG. 2. When the printing is performed on a printing sheet P, the carriage 3 driven by the carriage motor 4 is reciprocated in the primary scanning direction MS, while the printing medium fed from the hopper 11 into the inside of the printer 1 P by the sheet feeding roller 12 and the separation pad 13 is being fed in the secondary scanning direction SS by the sheet feeding roller 6 driven by the sheet feeding motor 5. When the carriage 3 is reciprocated, the print head 2 ejects ink droplets to perform the printing on the printing sheet P. Also, when the printing on the printing sheet P is finished, the printing sheet P is ejected out of the printer 1 by the sheet ejecting roller 15. When the printing is performed on the printing sheet P, the sheet detector 14 outputs an output signal according to the presence or absence of the printing sheet P fed into the inside of the printer 1. And the printer 1 performs the predetermined control for the print head 2 or the sheet feeding roller 6, based on a control signal generated from this output signal.

In the printer 1, when the printing is performed on an optical disk D, the sheet feeding roller 6, the platen 7, the sheet guide plate 30 and the sheet ejecting roller 15 descend from the state as shown in FIG. 2. The user moves the tray guides 86 from the state as indicated by the dashed chain line in FIG. 6 to the state as indicated by the solid line in FIG. 6. Thereafter, the carriage 3 driven by the carriage motor 4 is reciprocated in the primary scanning direction MS, while the optical disk D laid on the disk tray 85 is fed from the front side into the inside of the printer 1 by the tray motor (not shown). When the carriage 3 is reciprocated, the print head 2 ejects ink droplets to perform the printing on the optical disk D. Also, when the printing on the optical disk D is finished, the optical disk D is ejected on the front side of the printer 1 by the tray motor. When the printing is performed on the optical disk D, the tray detector 89 outputs an output signal according to the presence or absence of the disk tray 85, and the tray guide detector 90 outputs an output signal according to the state of the tray guide 86. And the printer 1 performs the predetermined control for the print head 2 or the tray motor, based on a control signal generated from these output signals.

When the printing is performed on the printing sheet P, the gap adjuster 70 adjusts the gap between the nozzle face of the print head 2 and the platen 7, as needed. For example, when the thickness of the printing sheet P is changed, it adjusts the gap between the nozzle face of the print head 2 and the platen 7. At the time of adjustment, the gap adjuster 79 outputs an output signal according to the position of the print head 2. And the printer 1 performs the predetermined control for the print head 2 or the sheet feeding roller 6, based on a control signal generated from this output signal.

Next, there will be subsequently described how to generate a control signal for judging the presence or absence of the printing sheet P fed into the inside of the printer 1, a control signal for judging the position of the print head 2, a control signal for judging the presence or absence of the disk tray 85 and a control signal for judging the state of the tray guide 86.

First, how to generate the control signal for judging the presence or absence of the printing sheet P fed into the inside of the printer 1 will be described below. In this embodiment, how to generate the control signal during the continuous printing for performing the printing on a plurality of printing sheets P consecutively and how to generate the control signal during the one sheet printing for performing the printing on one sheet of printing sheet P are different. Further, during the continuous printing, how to generate the control signal for judging the leading edge of the first printing sheet P and the trailing edge of the last printing sheet P and how to generate the control signal for judging the leading edges of the second to the last printing sheets P and the trailing edges of the first to the second-last printing sheets P are different.

Figures 12A, 12B, 12C, 12D:
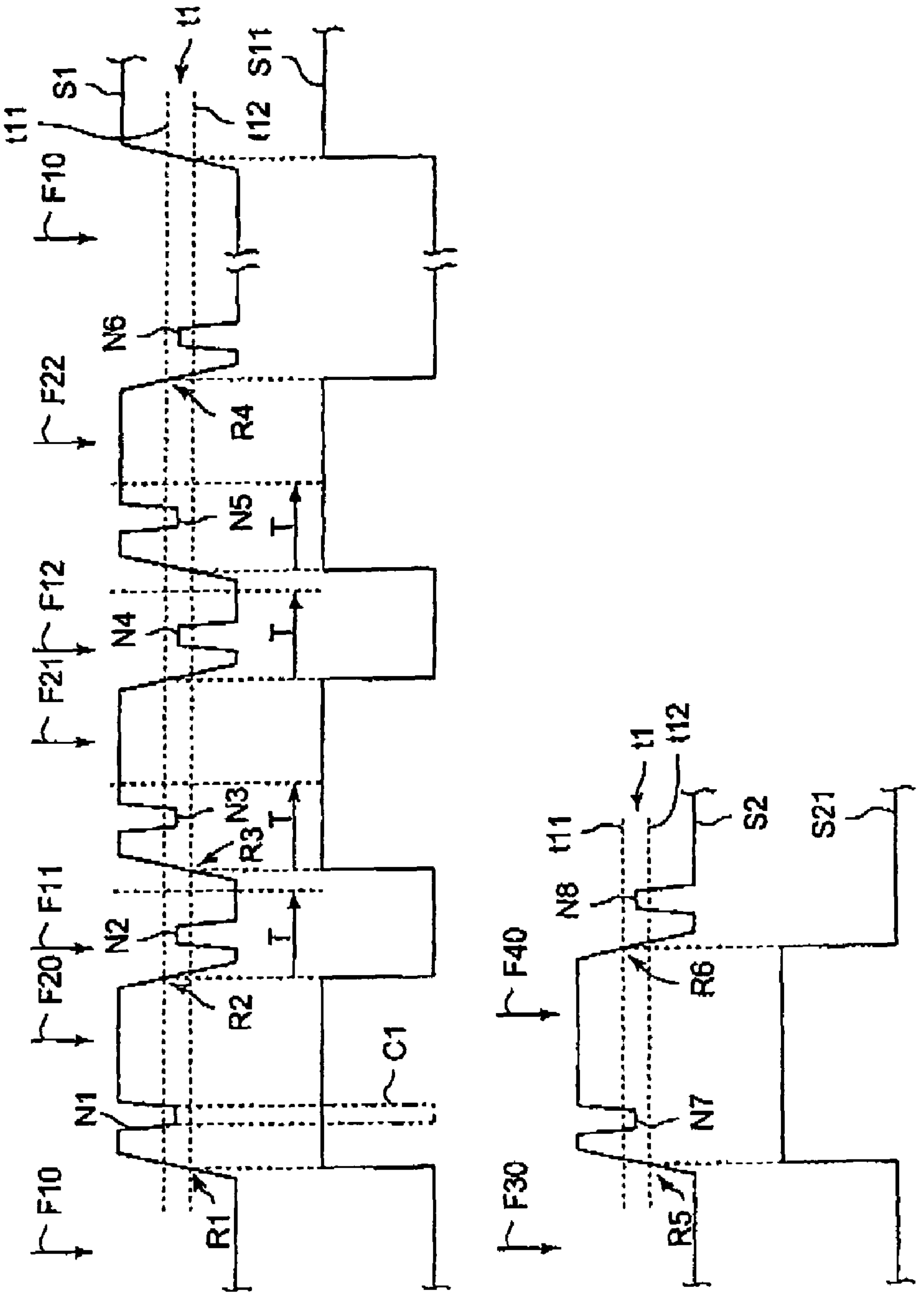
FIGS. 12A and 12B are time charts showing a relationship between a signal output from the sheet detector and a control signal for judging a state of a printing sheet, in a case where continuous printing is performed with respect to a plurality of printing sheets.
FIGS. 12C and 12D are time charts showing a relationship between a signal output from the sheet detector and a control signal for judging a state of a printing sheet in a case where printing is performed with respect to only one printing sheet.
Figure 17:
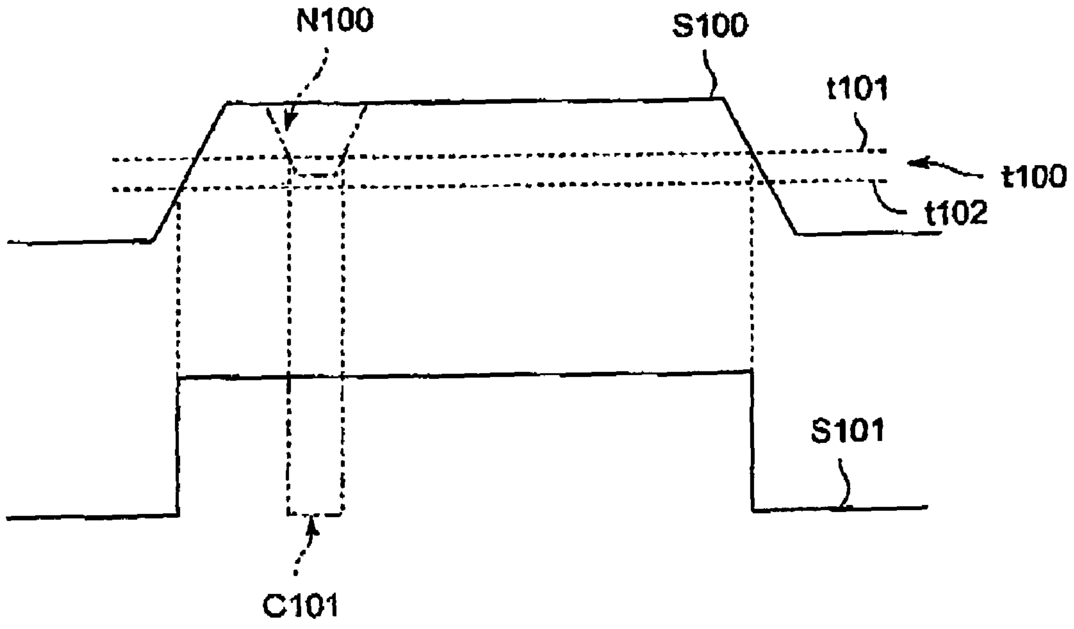
FIG. 17 is a time chart showing a relationship between a signal output from a detector and a control signal for judging a state of a detected object, according to a related art example.

In the following, how to generate the control signal during the continuous printing will be described using an example of performing the continuous printing on three printing sheets P. In this embodiment, when the detection lever 26 intercepts the light from the light emitter 45 to the light receiver 46 as indicated by the dashed chain line in FIG. 4A, the sheet detector 14 outputs an output signal at low level, or when the light receiver 46 receives the light from the light emitter 45 as indicated by the solid line in FIG. 4B, the sheet detector 14 outputs an output signal at high level. Accordingly, the sheet detector 14 outputs an output signal S1 of the waveform as shown in FIG. 12A, for example, during the continuous printing. The sheet detector 14 outputs an output signal S2 of the waveform as shown in FIG. 12C, for example, during the one sheet printing.

Herein, every time the output signal S1 is changed from low level to high level, or from high level to low level, the electrical noise N1 to N6 of almost same magnitude occurs only once in the output signal S1 as shown in FIG. 12A. This noise N1 to N6 is provided for the sake of convenience of explanation, but the noise does not necessarily occur every time the output signal S1 is changed in level. The magnitude of the noise is not uniform, and the number of noise occurrences after the change of level is not limited to one. The noises N7 to N14 in FIG. 12C and FIGS. 13 to 16 are similarly treated. In practice, when the trailing edge of the printing sheet P gets out of the lower end of the detection lever 26 and the leading edge of the next printing sheet P comes into contact with the lower end of the detection lever 26 during the continuous printing, the noise is likely to occur in the output signal S1 from the sheet detector 14. That is, when the detection lever 26 is pivoted, the noise is likely to occur in the output signal S1.

The output signal S1 from the sheet detector 14 is set to a predetermined threshold t1, as shown in FIG. 12A. In this embodiment, the threshold range t1 having an upper threshold t11 and a lower threshold t12 is set. And a digital control signal S11 for judging the presence or absence of the printing sheet P fed into the inside of the printer 1 is generated from the output signal S1 and the threshold range t1. The control signal generator of the ASIC 54 performs this processing. In this embodiment, when the control signal S11 is at high level, it is judged that the printing sheet P is fed into the inside of the printer 1 (i.e., there is a printing sheet P), or when the control signal S11 is at low level, it is judged that the printing sheet P is not fed into the inside of the printer 1 (i.e., there is not a printing sheet P).

The timing signal generator of the ASIC 54 outputs the timing signals F10 to F12 and F20 to F22 for notifying the timing for judging the leading edge and the trailing edge of the printing sheet P to the control signal generator. As shown in FIG. 12A, the timing signals F10 to F12 are the signals for notifying the judgment timing for the leading edge of the printing sheet P to the control signal generator. The timing signals F10 to F12 are the operation instruction signals for feeding the printing sheet P into the inside of the printer 1 to the sheet feeding roller 12. The timing signals F20 to F22 are the signals for notifying the judgment timing for the trailing edge of the printing sheet P to the control signal generator.

In the case where the leading edge of the first printing sheet P is judged during the continuous printing, the control signal S11 is generated by a precedent reading method in which the control signal S11 is made valid when the output signal S1 outputted from the sheet detector 14 undergoes the level change of reaching the threshold range t1 by a predetermined number of times (in this case, once, or when the level change of firstly reaching the threshold range t1 occurs) after the timing signal (operation instruction signal to the sheet feeding roller 12) F10 is outputted, and the control signal S11 is not changed until the timing signal F20 becoming the next timing signal is outputted. That is, at a time point R1 when the level of the output signal S1 after the timing signal F10 is outputted becomes firstly higher than the lower threshold t12, the control signal S11 is changed from low level to high level, and not changed in level until the timing signal F20 is outputted, as shown in FIG. 12A.

Therefore, even when the noise N1 occurs in the output signal reaching the upper threshold t11 (becoming lower than the upper threshold t11) after the level of the control signal S11 is changed, the control signal S11 remains at high level, and is not changed in level. If the control signal S11 is not made valid at a time point R1 when the level of the output signal S1 is higher than the lower threshold t12, the control signal S11 undergoes the level change C1 due to the noise N1. And a false judgment is made that the feeding of the first printing sheet P is finished and the feeding of the second printing sheet P is started.

Similarly, in the case where the trailing edge of the last printing sheet P (the third sheet in the example as shown in FIG. 12A) is judged during the continuous printing, the control signal S11 is produced by the precedent reading method. That is, at a time point R4 when the level of the output signal S1 firstly reaches the upper threshold t11 (becomes lower than the upper threshold t11) after the timing signal F22 is outputted, the control signal S11 is changed from high level to low level, and not changed in level until the next timing signal (timing signal for notifying the timing for judging the leading edge of the first printing sheet P during the next continuous printing) F10 is outputted, as shown in FIG. 12A. Therefore, even when the noise N6 occurs in the output signal reaching the lower threshold t12 after the level of the control signal S11 is changed, the control signal S11 remains at low level, and is not changed in level.

On the other hand, in the case where the trailing edge of the first to second-last printing sheets (first and second sheets in the example as shown in FIG. 12A) P or the leading edge of the second or later printing sheets P is judged during the continuous printing, the control signal S11 is generated by a mask reading method in which the control signal S11 is made valid when the output signal S1 outputted from the sheet detector 14 undergoes the level change of reaching the threshold range t1 after the timing signals F11, F12, F20 and F21 are outputted, and the control signal S11 is not changed for a subsequent mask time period T. That is, at a time point R2 when the level of the output signal S1 reaches the upper threshold t11 (becomes lower than the upper threshold t11) after the timing signal F20 is outputted, the control signal S11 is changed from high level to low level, and thereafter not changed for the mask time period T, as shown in FIG. 12A. Also, since the control signal S11 is not changed for the mask time period T, the control signal S11 is changed from low level to high level at a time point R3 when the output signal S1 is higher than the lower threshold t12 with the passage of the mask time period T after the timing signal F11 is outputted, and thereafter not changed for the mask time period T. Therefore, even when the noise N2 occurs in the output signal reaching the lower threshold t12 or the noise N3 occurs in the output signal reaching the upper threshold t11 occurs after the level of the control signal S11 is changed, the control signal S11 is not changed in level.

Herein, a determination cycle for determining the level change of the output signal S1 after the timing signals F10 to F12 and F20 to F22 are outputted is a PID period that is an operation period of the PID control for the carriage motor 4 or the sheet feeding motor 5. When the PID period for the carriage motor 4 is employed as the determination cycle, the determination cycle is 58.5 μsec, for example. Also, when the PID period for the sheet feeding motor 5 is employed as the determination cycle, the determination cycle is 64 μsec, for example. The determination cycle is not limited to the PID period, but may be other control cycles.

The mask time period T is preferably determined in consideration of the maximum feeding speed of the printing sheet P in the printer 1 and the reaction speed of the photo sensor 27. That is, the mask time period T is preferably determined in consideration of the shortest time after the trailing edge of the printing sheet P gets out of the lower end of the detection lever 26 till the leading edge of the next printing sheet P comes in contact with the lower end of the detection lever 26, and the reaction speed of the photo sensor 27. With this configuration, even when the mask time period T is set up, the leading edge of the printing sheet P can be securely detected. For example, in this embodiment, the maximum feeding speed of the printing sheet P is 11.6 ips (inch per second); and the mask time period T is 20 msec.

The mask time period T is preferably 5 msec or more. A cause of occurrence of the electrical noise in the output signal S1 from the sheet detector 14 is the static electricity arising at the terminal part (not shown) of the photo sensor 27, and this electrical noise caused by the static electricity occurs in about 1 to 3 msec after the trailing edge of the printing sheet P gets out of the lower end of the detection lever 26 or after the leading edge of the printing sheet P comes in contact with the lower end of the detection lever 26. Accordingly, when the mask time period T is 5 msec or more, the control signal S11 can be generated by removing the influence of the electrical noise occurring in the output signal S1.

The mask time period T is counted by the timer of 1 kHz inside the ASIC 54. That is, in this embodiment, the determination cycle for determining the level change of the output signal S1 after the timing signal F11, F12, F20 and F21 is outputted is the control cycle for the PID control, as described above, whereas the mask time period T is not counted at the control cycle for the PID control, but counted by the timer of 1 kHz. More specifically, the level change of the output signal S1 is determined at the control cycle for the PID control till a time point R2 when the level of the output signal S1 reaches the upper threshold t11 after the timing signal F20 is outputted, and the timer of 1 kHz causes an interruption at a time point R2 when the upper threshold t11 is reached and counts the mask time period T. Also, when the counting of the mask time period T is finished (the mask time period T has elapsed), the level change of the output signal S1 is determined at the control cycle for the PID control again. In this embodiment, because the mask time period T is 20 msec, for example, the timer of 1 kHz is preferably employed to count the mask time period T, but the timer of 1 MHz may be employed to count the mask time period T, depending on the mask time period T.

Next, how to generate the control signal during the one sheet printing will be described below. The output signal S2 from the sheet detector 14 is set to a predetermined threshold range t1 having an upper threshold t11 and a lower threshold t12 in the same way as during the continuous printing, as shown in FIG. 12C. And a digital control signal S21 for judging the presence or absence of the printing sheet P fed into the inside of the printer 1 is generated from the output signal S2 and the threshold range t1. Also, when the control signal S21 is at high level, it is judged that the printing sheet P is fed into the inside of the printer 1, or when the control signal S21 is at low level, it is judged that the printing sheet P is not fed into the inside of the printer 1. Further, the timing signal generator of the ASIC 54 outputs the timing signals F30 and F40 for notifying the timing for judging the leading edge and the trailing edge of the printing sheet P to the control signal generator in the same way as during the continuous printing. The timing signals F30 is the signal for notifying the judgment timing for the leading edge of the printing sheet P to the control signal generator, and is an operation instruction signal for feeding the printing sheet P into the inside of the printer 1 to the sheet feeding roller 12, for example. The timing signal F40 is the signal for notifying the judgment timing for the trailing edge of the printing sheet P to the control signal generator.

In this embodiment, in the case where the leading edge or the trailing edge of the printing sheet P is judged during the one sheet printing, the control signal S21 is generated by the precedent reading method. That is, at a time point R5 when the level of the output signal S2 is firstly higher than the lower threshold t12 after the timing signal F30 is outputted, the control signal S21 is changed from low level to high level, and not changed in level until the timing signal F40 is outputted, as shown in FIG. 12C. Therefore, even when the noise N7 occurs in the output signal reaching the upper threshold t11 after the level of the control signal S21 is changed, the control signal S21 remains at high level, and is not changed in level. Also, at a time point R6 when the level of the output signal S2 firstly reaches the upper threshold t11 after the timing signal F40 is outputted, the control signal S21 is changed from high level to low level, and not changed in level until the next timing signal is outputted. Therefore, even when the noise N8 occurs in the output signal reaching the lower threshold t12 after the level of the control signal S21 is changed, the control signal S11 remains at low level, and is not changed in level.

Next, how to generate the control signal for judging the position of the print head 2 will be described below, In the following, how to generate the control signal will be described using an example in which the position of the print head 2 is changed from a state where the detection part 76*e* intercepts the light from the light emitter 83 to the light receiver 84 (i.e., state where the print head 2 is at the first height) to a state where the detection part 76*b* intercepts the light from the light emitter 83 to the light receiver 84 (the height of the print head 2 at this time is made the fourth height), as shown in FIG. 10.

In this embodiment, when the detection part 76*e* intercepts the light from the light emitter 83 to the light receiver 84, the gap detector 79 outputs an output signal of high level, and when the light receiver 84 receives the light from the light emitter 83, the gap detector 79 outputs an output signal of low level, as shown in FIG. 10. Accordingly, the gap detector 79 outputs an output signal S3 of the waveform as shown in FIG. 13A, for example.

The output signal S3 from the gap detector 79 is set to a predetermined threshold range t3 having an upper threshold t31 and a lower threshold t32, as shown in FIG. 13A. And a digital control signal S31 for judging the position of the print head 2 is generated from the output signal S3 and the threshold range t3. The control signal generator of the ASIC 54 performs this processing. In this embodiment, when the control signal S31 is at high level, it is judged that the height of the print head 2 is the predetermined set height (i.e., the gap between the nozzle face of the print head 2 and the platen 7 is the predetermined set gap according to the thickness of the printing sheet P), or when the control signal S31 is at low level, it is judged that the height of the print head 2 is not the predetermined set height.

The timing signal generator of the ASIC 54 outputs a timing signal F50 for notifying the timing for judging the position of the print head 2 to the control signal generator. The timing signal F50 is an operation instruction signal for changing the height of the print head 2 to the gap adjusting motor 73.

In this embodiment, the control signal S31 for judging the position of the print head 2 is generated by the precedent reading method. That is, the control signal S31 is made valid when the output signal S3 outputted from the gap detector 79 undergoes the level change of reaching the threshold range t3 by a predetermined number of times after the timing signal (operation instruction signal to the gap adjusting motor 73) F50 is outputted, and the control signal S31 is not changed until the timing signal F50 becoming the next timing signal is outputted, as shown in FIG. 13.

Specifically, when the detection plate 76 is rotated counterclockwise, for example, in accordance with an operation instruction signal (i.e., timing signal F50) to the gap adjusting motor 73, the detection part 76*e* gets out of a sensing area (between the light emitter 83 and the light receiver 84) of the photo sensor 77, and the detection parts 76*f* and 76*a* pass successively through the sensing area of the photo sensor 77, so that the detection part 76*b* intercepts the light from the light emitter 83 to the light receiver 84. Meanwhile, the output signal S3 outputted from the gap detector 79 is changed six times from high level to low level, and from low level to high level across the threshold range t3. That is, the output signal S3 undergoes the level change of reaching the threshold range t3 six times, and at a time point R7 when the output signal S3 undergoes the sixth level change of reaching the threshold range t3 after the timing signal F50 is outputted, the control signal S31 is changed from low level to high level and made valid, and not changed in level until the next timing signal F50 is outputted, as shown in FIG. 13A. Therefore, even when the noise N9 occurs in the output signal reaching the upper threshold t31 after the level of the control signal S31 is changed, the control signal S31 remains at high level, and is not changed in level.

Next, how to generate the control signal for judging the presence or absence of the disk tray 85 will be described below. In this embodiment, the disk tray 85 is moved to the left in FIG. 6, and comes in contact with the switch lever 89*a*, so that the switch lever 89*a* is moved clockwise by a predetermined angle, in which when the contact point of the contact part 89*b* is on, the tray detector 89 outputs an output signal of high level, or when the contact point of the contact part 89*b* is off, the tray detector 89 outputs an output signal of low level. Accordingly, the tray detector 89 outputs an output signal S4 of the waveform as shown in FIG. 14A, for example.

The output signal S4 from the tray detector 89 is set to a predetermined threshold range t4 having an upper threshold t41 and a lower threshold t42, as shown in FIG. 14A. And a digital control signal S41 for judging the presence or absence of the disk tray 85 is generated from the output signal S4 and the threshold range t4. The control signal generator of the ASIC 54 performs this processing. In this embodiment, when the control signal S41 is at high level, it is judged that the disk tray 85 is fed into the inside of the printer 1 (i.e., there is the disk tray 85), or when the control signal S41 is at low level, it is judged that the disk tray 85 is not fed into the inside of the printer 1 (i.e., there is not the disk tray 85).

The timing signal generator of the ASIC 54 outputs the timing signals F60 and F70 for notifying the timing for judging the presence or absence of the disk tray 85 to the control signal generator. The timing signals F60 and F70 are the operation instruction signals for feeding the disk tray 85 into the inside of the printer 1 to the tray motor. The timing signal F60 is the signal for notifying the timing for judging whether or not the disk tray 85 is fed into the inside of the printer 1 to the control signal generator, and the timing signal F70 is the signal for notifying the timing for judging whether or not the disk tray 85 is taken out of the inside of the printer 1 to the control signal generator.

In this embodiment, the control signal S41 for judging the presence or absence of the disk tray 85 is generated by the precedent reading method. That is, the control signal S41 is made valid when the output signal S4 outputted from the tray detector 89 undergoes the level change of reaching the threshold range t4 by a predetermined number of times (in this case, once, namely, when the level change of reaching the threshold range t4 is firstly made) after the timing signal (operation instruction signal to the tray motor) F60 is outputted, and the control signal S41 is not changed until the timing signal F70 becoming the next timing signal is outputted, as shown in FIG. 14. Specifically, the control level S41 is changed from low level to high level and made valid at a time point R8 when the level of the output signal S4 is higher than the lower threshold t42 after the timing signal F60 is outputted, and not changed in level until the next timing signal F70 is outputted, as shown in FIG. 14A. Therefore, even when the noise N10 occurs in the output signal reaching the upper threshold t41 occurs after the level change of the control signal S41, the control signal S41 remains at high level, and is not changed in level.

Likewise, the control signal S41 is made valid when the output signal S4 outputted from the tray detector 89 undergoes the level change of reaching the threshold range t4 for the first time after the timing signal F70 is outputted, and the control signal S41 is not changed until the timing signal F60 becoming the next timing signal is outputted, as shown in FIG. 14B. That is, the control level S41 is changed from high level to low level and made valid at a time point R9 when the level of the output signal S4 is lower than the upper threshold t41 after the timing signal F70 is outputted, and not changed in level until the next timing signal F60 is outputted, as shown in FIG. 14A. Therefore, even when the noise N11 occurs in the output signal reaching the lower threshold t42 after the level change of the control signal S41, the control signal S41 remains at low level, and is not changed in level.

Finally, how to generate the control signal for judging the state of the tray guide 86 will be described below. In this embodiment, the tray guide detector 90 outputs an output signal of high level, when the contact point of the contact part 90*b* is on, as shown in FIG. 7A, whereas the tray guide detector 90 outputs an output signal of low level, when the contact point of the contact part 90*b* is off, as shown in FIG. 7B. Accordingly, the tray guide detector 90 outputs an output signal S5 of the waveform as shown in FIG. 15A, for example.

The output signal S5 from the tray guide detector 90 is set to a predetermined threshold range t5 having an upper threshold t51 and a lower threshold t52, as shown in FIG. 15A. And a digital control signal S51 for judging the state of the tray guide 86 is generated from the output signal S5 and the threshold range t5. The control signal generator of the ASIC 54 performs this processing. In this embodiment, when the control signal S51 is at high level, it is judged that the tray guide 86 is in a state capable of guiding the disk tray 85 as indicated by the solid line in FIG. 6, or when the control signal S51 is at low level, it is judged that the tray guide 86 is in a state incapable of guiding the disk tray 85 as indicated by the dashed chain line in FIG. 6.

In this embodiment, the control signal S51 for judging the state of the tray guide 86 is generated by a normal reading method. That is, every time the output signal S5 outputted from the tray guide detector 90 undergoes the level change of reaching the threshold range t5, the control signal S51 is changed from low level to high level, or from high level to low level, as shown in FIG. 15B. Therefore, when the electrical noise N12, N13 occurs, the control signal S51 undergoes the level change C2, C3. However, it is seldom that the noise occurs in this output signal S5 reaching the threshold range t5.

As described above, in this embodiment, the control signal S11 for judging the presence or absence of the printing sheet P fed into the inside of the printer 1 during the continuous printing is generated by the precedent reading method when judging the leading edge of the first printing sheet P and the trailing edge of the last printing sheet P, and generated by the mask reading method when judging the trailing edge of the first to second-last printing sheets P and the leading edge of the second or later printing sheets P. The control signal S21 for judging the presence or absence of the printing sheet P fed into the inside of the printer 1 during the one sheet printing is generated by the precedent reading method. Further, the control signal S31 for judging the position of the print head 2 and the control signal S41 for judging the presence or absence of the disk tray 85 are generated by the precedent reading method. Therefore, even when the electrical noises N1 to N11 occur in the output signals S1 to 84 from each detector such as the sheet detector 14, it is possible to prevent the false detection of the state of the detected object (printing sheet P or print head 2) caused by the noises N1 to N11, as shown in FIGS. 12A through 14B.

Before the leading edge of the printing sheet P comes in contact with the lower end of the detection lever 26 and the upper end of the detection lever 26 gets out of the part between the light emitter 45 and the light receiver 46, or before the trailing edge of the printing sheet P gets out of the lower end of the detection lever 26 and the detection lever 26 intercepts the light from the light emitter 45 to the light receiver 46, the possibility that the electrical noise occurs in the output signal S1, S2 from the sheet detector 14 is low. Therefore, when the leading edge of the first printing sheet P or the trailing edge of the last printing sheet P is judged during the continuous printing, or when the leading edge or trailing edge of the printing sheet P is judged during the one sheet printing, the control signal S11 or S12 is generated by the precedent reading method, whereby the leading edge and trailing edge of the printing sheet P can be judged appropriately.

On the other hand, if the control signal S11 for judging the trailing edge of the first to second-last printing sheets P and the leading edge of the second or later printing sheets P is generated by the precedent reading method during the continuous printing, it is difficult to appropriately judge the presence or absence of the printing sheet P because the detection lever 26 is frequently pivoted and the timing signal is frequently outputted, and because the time period after the trailing edge of the printing sheet P passes under the detection lever 26 till the timing signal F11 and F12 is outputted is short. For example, the output timing of the timing signal F11 may occur earlier than the occurrence timing of the noise N2 during the continuous printing, as shown in FIG. 12A. Therefore, when the control signal S11 is generated by the precedent reading method, there is a possibility that the presence or absence of the printing sheet P is falsely detected.

However, in this embodiment, since the control signal S11 is generated by the mask reading method, the occurrence of false detection is prevented during the continuous printing, whereby the presence or absence of the printing sheet P fed into the inside of the printer 1 can be appropriately judged. That is, in the case where the control signal S11 is generated by the mask reading method, the mask time point R can be appropriately set in consideration of the time after the trailing edge of the certain printing sheet P passes under the sheet detector 14 till the leading edge of the next printing sheet P passes, whereby the presence or absence of the printing sheet P can be judged appropriately.

The frequency of changing the position of the print head 2 (i.e., the frequency of adjusting the gap between the nozzle face of the print head 2 and the platen 7) is not so high, and the timing signal F50 for notifying the judgment timing for the position of the print head 2 is outputted less frequently. Also, with the configuration of the gap adjuster 70, it is unlikely that the output signal S3 outputted from the gap detector 79 undergoes the level change of reaching the threshold range t3 by a predetermined number of times, and the electrical noise occurs before the control signal S31 is made valid. Therefore, the control signal S31 for judging the position of the print head 2 is generated by the precedent reading method, whereby the position of the print head 2 can be judged appropriately. The generation process for the control signal S31 where the control signal S31 for judging the position of the print head 2 is generated by the precedent reading method is simpler than where the control signal S31 for judging the position of the print head 2 is generated by the mask reading method.

Moreover, the frequency of detecting the presence or absence of the disk tray 85 is not so high, and the timing signals F60 and F70 for the disk tray 85 are outputted less frequently. Also, with the configuration of the disk tray 85, it is unlikely that the output signal S4 outputted from the tray detector 89 undergoes the level change of reaching the threshold for the first time, and the electrical noise occurs before the control signal S41 is made valid. Therefore, the control signal S41 for judging the presence or absence of the disk tray 85 is generated by the precedent reading method, whereby the presence or absence of the disk tray 85 can be judged appropriately. Also, when the control signal S41 for judging the presence or absence of the disk tray 85 is generated by the precedent reading method, the generation process for the control signal S41 is simplified.

Thus, in this embodiment, the control signal is generated by the method conforming to the configurational features of the detected object (the precedent reading method or the mask reading method) for preventing the false detection of the printing sheet P, the print head 2 and the disk guide 85. Accordingly, the control signal for judging the state of the detected object can be generated by the suitable method according to the configurational features of the detected object.

When the tray guide 86 is once set at the guide position of the disk tray 85 to perform the printing on the optical disk D, the position of the tray guide 86 is not changed until the printing on the optical disk D is finished. That is, the frequency of changing the position of the tray guide 86 is low. Also, it is uncommon that the control signal for judging the state of the tray guide 86 is used as a trigger to perform the continuous operation such as a series of printing operations. Therefore, the position of the tray guide 86 can be judged appropriately by generating the control signal S51 for judging the position of the tray guide 86 by the normal reading method. The generation process for the control signal S51 is simplified by generating the control signal S51 for judging the position of the tray guide 86 by the normal reading method In this embodiment, the ASIC 54 has the timer of 1 kHz and the timer of 1 MHz for counting the mask time period T in generating the control signal S11 by the mask reading method. Therefore, the mask time period T can be counted by the timer operating at the appropriate frequency (period) according to the mask time period T. As a result, the counting process for the mask time period T is simplified. That is, when the mask time period T of 20 msec is counted at the control cycle for the PID control of 64 μsec, the counting process for the mask time period T is complicated, but when the mask time period T of 20 msec is counted by the timer of 1 kHz in which the counting cycle is 1 msec, the counting process for the mask time period T is simplified.

Also, in this embodiment, the determination cycle for the level change of the output signal S1 after the timing signal F20, F21, F11 and F12 is outputted is the control cycle for the PID control of the sheet feeding motor 5. Therefore, the level change of the output signal S1 for judging the presence or absence of the printing sheet P can be determined at the appropriate period. That is, the appropriate control cycle can be chosen as the determination cycle for the level change of the output signal S1, irrespective of the counting cycle for the timer of 1 kHz or 1 MHz, whereby the presence or absence of the printing sheet P fed into the inside of the printer 1 can be appropriately judged based on the level change of the output signal S1 determined at the appropriate determination cycle.

Particularly, in this embodiment, the determination cycle for the level change of the output signal S1 is the control cycle for the PID control of the sheet feeding motor 5. Therefore, the control cycle for the PID control of the sheet feeding motor 5 easily available as the determination cycle can be employed, whereby the determination process for the level change of the output signal S1 is simplified.

Although only some exemplary embodiments of the invention have been described in detail above, those skilled in the art will readily appreciated that many modifications are possible in the exemplary embodiments without materially departing from the novel teachings and advantages of the invention. Accordingly, all such modifications are intended to be included within the scope of the invention.

In the above embodiment, the precedent reading method, the mask reading method and the normal reading method are employed to generate the control signals S11 to S51. In addition, a control signal S61 for judging the state of a predetermined detected object may be generated by a follow-up reading method in which the control signal S61 is made valid based on the last level change of reaching the predetermined threshold range t6 having an upper threshold t61 and a lower threshold t62 in the output signal S6 from the detector within a predetermined time period T10 after the timing signal F100 is outputted (i.e., the control signal S61 is made valid at high level, when the last level change of the output signal S6 is rising, or the control signal S61 is made valid at low level, when the last level change of the output signal S6 is falling), and the control signal S61 is unchanged until the next timing signal F100 is outputted, as shown in FIG. 16.

That is, the control signal S61 may be generated such that at a time point R10 when the output signal S6 from the detector reaches the threshold range t6 lastly within a predetermined time period T10 after the timing signal F100 is outputted, the control signal S61 is changed from low level to high level, and not changed in level until the next timing signal F100 is outputted. When the control signal S61 is generated in this way, the control signal S61 is not changed in level even though the noise N14 occurs in the output signal S6 before the last level change of reaching the threshold range t6. Therefore, with the configuration of the detected object, when it is unlikely that the electrical noise occurs after the state of the detected object is changed, the state of the detected object can be appropriately judged when the control signal S61 is generated by the follow-up reading method. Also, when the control signal S61 is generated by the follow-up reading method, the final state of the detected object can be confirmed.

In the above embodiment, the control signal S21 for judging the presence or absence of the printing sheet P fed into the inside of the printer 1 during the one sheet printing is generated by the precedent reading method. However, the control signal S21 may be generated by the mask reading method.

In the above embodiment, the control signal S11 for judging the presence or absence of the printing sheet P fed into the inside of the printer 1 during the continuous printing is generated by the precedent reading method when the leading edge of the first printing sheet P and the trailing edge of the last printing sheet P are judged. However, the control signal S11 may be generated by the mask reading method.

Further, the control signal S31 for judging the position of the print head 2 or the control signal S41 for judging the presence or absence of the disk tray 85 may be generated by the mask reading method. In these cases, the ASIC 54 may be provided with the timer according to the predetermined mask time period, in which the mask time period is counted by this timer, and the determination cycle for the level change of the output signals S3 and S4 may be the predetermined control cycle other than the counting cycle of the timer.

In the above embodiment, the control cycle for the PID control of the sheet feeding motor 5 is used as the determination cycle for the level change of the output signal S1. However, the control cycle for the PID control of the carriage motor 4 may be used as the determination cycle for the level change of the output signal S1. Further, other control cycles for controlling the printer 1 may be used as the determination cycle for the level change of the output signal S1.

In the above embodiment, the ASIC 54 has the timer of 1 kHz and the timer of 1 MHz. However, the ASIC 54 may be provided with the timer with other cycle (frequency) in accordance with the mask time period T.

In the above embodiment, a part of the ASIC 54 serves the control signal generator. However, each of the sheet detector 14, the gap detector 79, the tray detector 89 and the tray guide detector 90 may comprise the control signal generator.

In the above embodiment, the threshold ranges t1 to t6 have the upper thresholds t11 to t61 and the lower thresholds t12 to t62, respectively. However, the threshold ranges t1 to t6 may be defined as one value.

In the above embodiment, at the time when the output signals S1 to S5 cross the upper thresholds t11 to t51 or the lower thresholds t12 to t52, the control signals S1 to S5 are changed in level. However, the control signals S1 to S5 may be changed in level when the state is satisfied continually for a predetermined time period since the output signals S1 to S5 cross the upper thresholds t11 to t51 or the lower thresholds t12 to t52.

In the above embodiment, the sheet detector 14 is the optical detector composed of the detection lever 26 and the photo sensor 27, and the gap detector 79 is the optical detector composed of the detection plate 76 and the photo sensor 77. However, the sheet detector 14 or the gap detector 79 may be a mechanical detector comprising a contact switch having a switch lever.

In the above embodiment, the tray detector 89 or the tray guide detector 90 is the mechanical contact switch comprising the switch lever 89*a*, 90*a* and the contact point 89*b*, 90*b*. However, the tray detector 89 or the tray guide detector 90 may be an optical detector.

In the above embodiment, the configuration of the invention has been described using an example in which the printer 1 is the ink jet printer for performing the printing by ejecting ink. However, the configuration of the invention may be applicable to the laser printer or other printers.

What is claimed is:

1. A method of controlling a printer which comprises:

a detector, operable to output an output signal in accordance with a state of a printing medium transported within the printer; and a control signal generator, operable to generate a control signal in accordance with a level of the output signal relative to a threshold, the method comprising:

detecting the output signal;

detecting a timing signal indicative of a timing to judge the state of the printing medium; and generating the control signal with at least two of:

a first method, in which the control signal is made valid when the level of the output signal reaches the threshold after the timing signal is detected, and the control signal is unchanged until first time period is elapsed from when the control signal is made valid;

a second method, in which the control signal is made valid when the level of the output signal reaches the threshold at least once after the timing signal is detected, and the control signal is unchanged until a next timing signal is detected; and a third method, in which the control signal is made valid in accordance with a condition that the level of the output signal lastly reaches the threshold before a second time period is elapsed from when the timing signal is detected, and the control signal is unchanged until a next timing signal is detected;

wherein:

the control signal is generated with at least the first method in a case where printing is performed with respect to a plurality of printing media consecutively;

the control signal is generated with the second method in a case where printing is performed with respect to only one printing medium; and the control signal is generated with the second method to detect a leading edge of the first one of the printing media.

2. A method of controlling a printer which comprises:

a detector, operable to output an output signal in accordance with a state of a printing medium transported within the printer; and a control signal generator, operable to generate a control signal in accordance with a level of the output signal relative to a threshold, the method comprising:

detecting the output signal;

detecting a timing signal indicative of a timing to judge the state of the printing medium; and generating the control signal with at least two of:

a first method, in which the control signal is made valid when the level of the output signal reaches the threshold after the timing signal is detected, and the control signal is unchanged until a first time period is elapsed from when the control signal is made valid;

a second method, in which the control signal is made valid when the level of the output signal reaches the threshold at least once after the timing signal is detected, and the control signal is unchanged until a next timing signal is detected; and a third method, in which the control signal is made valid in accordance with a condition that the level of the output signal lastly reaches the threshold before a second time period is elapsed from when the timing signal is detected, and the control signal is unchanged until a next timing signal is detected;

wherein:

the control signal is generated with at least the first method in a case where printing is performed with respect to a plurality of printing media consecutively;

the control signal is generated with the second method in a case where printing is performed with respect to only one printing medium; and the control signal is generated with the second method to detect a trailing edge of the last one of the printing media.

3. The method as set forth in claim 1, further comprising:

counting the first time period with a first cycle, wherein:

the output signal is detected with a second cycle different from the first cycle.

4. A method of controlling a printer which comprises:

a detector, operable to output an output signal in accordance with a state of a printing medium transported within the printer; and a control signal generator, operable to generate a control signal in accordance with a level of the output signal relative to a threshold, the method comprising:

detecting the output signal, detecting a timing signal indicative of a timing to judge the state of the printing medium;

generating the control signal with at least two of:

a first method, in which the control signal is made valid when the level of the output signal reaches the threshold after the timing signal is detected, and the control signal is unchanged until a first time period is elapsed from when the control signal is made valid;

a second method, in which the control signal is made valid when the level of the output signal reaches the threshold at least once after the timing signal is detected, and the control signal is unchanged until a next timing signal is detected; and a third method, in which the control signal is made valid in accordance with a condition that the level of the output signal lastly reaches the threshold before a second time period is elapsed from when the timing signal is detected, and the control signal is unchanged until a next timing signal is detected; and counting the first time period with a first cycle;

wherein:

the output signal is detected with a second cycle different from the first cycle; and the second cycle is a cycle of a PID control with respect to either a first motor operable to move a carnage mounting a print head adapted to performing the printing, or a second motor operable to transport the printing medium.

* * * * *